US006658409B1

(12) United States Patent
Nomura et al.

(10) Patent No.: US 6,658,409 B1
(45) Date of Patent: Dec. 2, 2003

(54) MESSAGE DATA RECEPTION DEVICE AND METHOD FOR CONTROLLING DISPLAY OF MESSAGE DATA ITEMS AND OTHER DATA ITEMS RELATED TO THE MESSAGE

(75) Inventors: Takashi Nomura, Machida (JP); Shoichi Nagatomo, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/233,757

(22) Filed: Jan. 20, 1999

(30) Foreign Application Priority Data

Jan. 23, 1998 (JP) .......................................... 10-011235
Jan. 5, 1999 (JP) .......................................... 11-000725

(51) Int. Cl.[7] ............................................... G06F 17/30
(52) U.S. Cl. .................... 707/4; 707/2; 707/3; 345/968
(58) Field of Search ............................... 707/3, 1, 2, 4, 707/101, 102, 104.1; 345/700, 156, 530, 968, 752, 751, 777

(56) References Cited

U.S. PATENT DOCUMENTS 4,943,868 A * 7/1990 Yoshinaga et al. .......... 358/403
5,008,854 A * 4/1991 Maeda et al. ............... 345/169
5,386,581 A * 1/1995 Suzuki et al. ............... 707/515
5,473,744 A * 12/1995 Allen et al. ................. 395/806
5,481,274 A * 1/1996 Aratani et al. ................ 345/98
5,606,712 A 2/1997 Hidaka
5,745,610 A * 4/1998 Johnson ...................... 382/309
5,874,953 A * 2/1999 Webster et al. ............. 345/733
5,890,175 A * 3/1999 Wong et al. ................ 707/505
5,914,707 A * 6/1999 Kono ......................... 345/173
5,920,858 A * 7/1999 Kitabayashi et al. ........... 707/4
6,154,214 A * 11/2000 Uyehara et al. ............ 345/358
6,331,867 B1 * 12/2001 Eberhard et al. ........... 345/864
6,334,126 B1 * 12/2001 Nagatomo et al. ............. 707/4
6,374,304 B1 * 4/2002 Chiashi ...................... 709/246

FOREIGN PATENT DOCUMENTS

EP 0 712 100 A1 5/1996
EP 0 798 621 A2 10/1997

OTHER PUBLICATIONS

Theimer et al "Operating Syste³≃Issues for PDAs", IEEE 1993, pp. 2–8.*

* cited by examiner

*Primary Examiner*—Uyen Le
(74) *Attorney, Agent, or Firm*—Frishauf, Holtz, Goodman & Chick, P.C.

(57) ABSTRACT

A portable data processing device with a data communication function is provided which includes an antenna, a receiver, a decoder, a RAM for storing a plurality of data items, and a CPU. The CPU retrieves, on the basis of identification data added to received data, associated data corresponding to the received data from among the data items stored in the RAM. The received data and the identification data are displayed on a display, and the associated data is then controlled to be displayed on the display in place of the received data. Accordingly, a message and other data relating to the contents of the message can be displayed by a simple input operation.

16 Claims, 37 Drawing Sheets

RM

| ADDRESS | RECEPTION ADDRESS | RECEIVED MESSAGE CONTENTS | SENDER CODE FLAG | SENDER CODE (LOWER FOUR DIGITS OF TEL NO.) | RECEPTION DAY AND TIME |
|---|---|---|---|---|---|
| 0000 | A | I RETURNED FIRST. | 0 | | 97. 11. 11 17:00 |
| 0100 | A | I WILL ATTEND MEETING. | 1 | 4321 | 97. 11. 12 10:00 |
| 0200 | A | I WILL SEND YOU MAIL. | 0 | | 97. 11. 12 15:00 |
| 0300 | A | PLEASE CALL ME. | 0 | | 97. 11. 13 17:00 |
| | | | | | |
| 0F00 | | | | | |

FIG.3

TL

| ADDRESS | TELEPHONE NUMBER | LOWER FOUR DIGITS | NAME | PRIVATE DATA (ADDRESS ETC.) |
|---|---|---|---|---|
| 1000 | 123-456- | 7890 | ICHIRO SATO | PRIVATE DATA 1 |
| 1100 | 098-765- | 4321 | TAROU NOMURA | PRIVATE DATA 2 |
| 1200 | 111-111- | 1111 | HIROKAZU SUZUKI | PRIVATE DATA 3 |
| 1300 | | | | |
| 1400 | | | | |
| | | | | |
| 1F00 | | | | |

FIG.4

SC

| ADDRESS | DAY AND TIME | SCHEDULE CONTENTS | ALARM FLAG |
|---|---|---|---|
| 2000 | 97. 10. 30 10:00~12:00 | MARKET RESEARCH FOR METROPOLITAN AREA A | 1 |
| 2100 | 97. 11. 04 10:00~12:00 | MARKET RESEARCH FOR METROPOLITAN AREA B | 1 |
| 2200 | 97. 11. 11 10:00~12:00 | MARKET RESEARCH FOR METROPOLITAN AREA C | 1 |
| 2300 | 97. 11. 12 13:00~15:00 | MEETING FOR MARKET RESEARCH (MEMBERS:MR.TANAKA,MR.SHIMIZU,MR.NOMURA) | 1 |
| 2400 | 97. 11. 18 10:00~12:00 | MARKET RESEARCH FOR KANSAI AREA C | 1 |
| | | | |
| 7F00 | | | |

FIG.5

MM

| ADDRESS | TITLE NO. | CONTENTS OF MEMO |
|---|---|---|
| 8000 | TITLE 1 | MEMO DATA 1 |
| 8100 | NEXT MEETING | DON'T FORGET TO GET '98 CATALOG OF Z COMPANY BY NEXT MEETING (FROM MR.NOMURA) |
| 8200 | TITLE 2 | MEMO DATA 2 |
| 8300 | TITLE 3 | MEMO DATA 3 |
| 8400 | TITLE 4 | MEMO DATA 4 |
| | | |
| CF00 | | |

FIG.6

174

| DETECTED TRANSMITTER CODE | SENDER NAME | COUNT VALUE OF ASSOCIATED DATA |
|---|---|---|
| | | |
| | | |
| THE NUMBER OF KEY OPERATIONS | READ ADDRESS | |
| | | |

FIG.7

RM

| ADDRESS | RECEPTION ADDRESS | RECEIVED MESSAGE CONTENTS | SENDER CODE FLAG | SENDER CODE (LOWER FOUR DIGITS OF TEL NO.) | RECEPTION DAY AND TIME |
|---|---|---|---|---|---|
| 0000 | A | I RETURNED FIRST. | 0 | | 97. 11. 11 17:00 |
| 0100 | A | I WILL ATTEND MEETING. | 1 | 4321 | 97. 11. 12 10:00 |
| 0200 | A | I WILL SEND YOU MAIL. | 0 | | 97. 11. 12 15:00 |
| 0300 | A | PLEASE CALL ME. | 0 | | 97. 11. 13 17:00 |
| 0400 | A | I DRAFTED MEETING REPORT. | 1 | 4321 | 97. 11. 15 17:00 |
| | | | | | |
| 0F00 | | | | | |

FIG.10

174

| DETECTED SENDER CODE | SENDER NAME | COUNT VALUE OF ASSOCIATED DATA |
|---|---|---|
| 4 3 2 1 | TARO NOMURA | 4 |
| ⋮ | ⋮ | ⋮ |

| THE NUMBER OF KEY OPERATIONS | READ ADDRESS |
|---|---|
| 5N | 0 4 0 0 |
| 5N+1 | 0 1 0 0 |
| 5N+2 | 1 1 0 0 |
| 5N+3 | 2 3 0 0 |
| 5N+4 | 8 1 0 0 |
| ⋮ | ⋮ |

FIG.11

DM

DMA

| ADDRESS | MANAGEMENT AREA | ICON |
|---|---|---|
| 3800~47FF | RECEIVED MESSAGE AREA |  |
| 4800~57FF | TELEPHONE NUMBER DIRECTORY AREA |  |
| 5800~97FF | SCHEDULE DATA AREA |  |
| 9800~DFFF | MEMO DATA AREA |  |

DMB

| SEARCH OBJECT DATA IN RECEIVED MESSAGE | FLAG F1 |
|---|---|
| FOUR DIGITS OF NUMERAL (SENDER CODE) | 1 |
| RECEPTION DAY AND TIME | 0 |
| KEYWORD 1 | 0 |
| ⋮ | ⋮ |

DMC

| ADDRESS OF RECEIVED MESSAGE | DETECTION DATA | ASSOCIATED KEYWORD | THE NUMBER OF ASSOCIATED DATA | CORRES-PONDING ADDRESS LA |
|---|---|---|---|---|
| 3900 | 4321 | NOMURA | 3 | 0 |
| | | | | |

DMD

| CORRESPONDING ADDRESS LA | ADDRESS OF ASSOCIATED DATA | FLAG F2 |
|---|---|---|
| 0 | A000 | 1 |
| 0 | 6100 | 1 |
| 0 | 4900 | 1 |
| | | |

FIG.16

RM

| ADDRESS | RECEPTION ADDRESS | RECEIVED MESSAGE CONTENTS | RECEPTION DAY AND TIME | FLAG F30 | UNCONFIRMATION FLAG F31 |
|---|---|---|---|---|---|
| 3800 | A | I RETURNED FIRST. | 97. 11. 11 17:00 | 0 | 0 |
| 3900 | A | I WILL ATTEND MEETING. | 97. 11. 12 10:00 | 1 | 1 |
| 4000 | A | I WILL SEND YOU MAIL. | 97. 11. 12 15:00 | 0 | 0 |
| 4100 | A | PLEASE CALL ME. | 97. 11. 13 17:00 | 1 | 0 |
| | | | | | |

FIG.17

TL

| ADDRESS | TELEPHONE NUMBER | LOWER FOUR DIGITS | NAME | PRIVATE DATA (ADDRESS ETC.) | FLAG F4 |
|---|---|---|---|---|---|
| 4800 | 123-456- | 7890 | ICHIRO SATO | PRIVATE DATA 1 | 0 |
| 4900 | 098-765- | 4321 | TAROU NOMURA | PRIVATE DATA 2 | 1 |
| 5000 | 111-111- | 1111 | HIROKAZU SUZUKI | PRIVATE DATA 3 | 0 |
| 5100 | | | | | |
| 5200 | | | | | |
| .... | .... | .... | .... | .... | .... |
| 5700 | | | | | |

FIG.18

SC

| ADDRESS | DAY AND TIME | SCHEDULE CONTENTS | ALARM FLAG | FLAG F5 |
|---|---|---|---|---|
| 5800 | 97. 10. 30 10:00~12:00 | MARKET RESEARCH FOR METROPOLITAN AREA A | 1 | 1 |
| 5900 | 97. 11. 04 10:00~12:00 | MARKET RESEARCH FOR METROPOLITAN AREA B | 1 | 1 |
| 6000 | 97. 11. 11 10:00~12:00 | MARKET RESEARCH FOR METROPOLITAN AREA C | 1 | 0 |
| 6100 | 97. 11. 12 13:00~15:00 | MEETING FOR MARKET RESEARCH (MEMBERS:MR.TANAKA,MR.SHIMIZU,MR.NOMURA) | 1 | 1 |
| 6200 | 97. 11. 18 10:00~12:00 | MARKET RESEARCH FOR KANSAI AREA C | 1 | 0 |
| . . . . | . . . . | . . . . | . . . . | . . . . |

FIG.19

MM

| ADDRESS | TITLE NO. | CONTENTS OF MEMO | FLAG F6 |
|---|---|---|---|
| 9800 | TITLE 1 | MEMO DATA 1 | 0 |
| A000 | NEXT MEETING | DON'T FORGET TO GET '98 CATALOG OF Z COMPANY BY NEXT MEETING (FROM MR.NOMURA) | 1 |
| A200 | TITLE 2 | MEMO DATA 2 | 1 |
| A400 | TITLE 3 | MEMO DATA 3 | 0 |
| A600 | TITLE 4 | MEMO DATA 4 | 0 |
| . . . . | . . . . | . . . . | . . . . |

FIG.20

RM

| ADDRESS | RECEPTION ADDRESS | RECEIVED MESSAGE CONTENTS | RECEPTION DAY AND TIME | FLAG F30 | UNCONFIRMATION FLAG F31 |
|---|---|---|---|---|---|
| 3800 | A | I RETURNED FIRST. | 97. 11. 11 17:00 | 0 | 0 |
| 3900 | A | I WILL ATTEND MEETING. | 97. 11. 12 10:00 | 1 | 1 |
| 4000 | A | I WILL SEND YOU MAIL. | 97. 11. 12 15:00 | 0 | 0 |
| 4100 | A | PLEASE CALL ME. | 97. 11. 13 17:00 | 1 | 0 |
| 4200 | A | I DRAFTED MEETING REPORT. | 97. 11. 15 17:00 | 1 | 0 |
| . . . . | . . . . | . . . . | . . . . | . . . . | . . . . |

FIG.26

DM

DMA

| ADDRESS | MANAGEMENT AREA | ICON |
|---|---|---|
| 3800~47FF | RECEIVED MESSAGE AREA |  |
| 4800~57FF | TELEPHONE NUMBER DIRECTORY AREA |  |
| 5800~97FF | SCHEDULE DATA AREA |  |
| 9800~DFFF | MEMO DATA AREA |  |

DMB

| SEARCH OBJECT DATA IN RECEIVED MESSAGE | EXECUTION FLAG F1 |
|---|---|
| FOUR DIGITS OF NUMERAL (SENDER CODE) | 1 |
| RECEPTION DAY AND TIME | 0 |
| KEYWORD 1 | 0 |
| ⋮ | ⋮ |

DMC

| ADDRESS OF RECEIVED MESSAGE | DETECTION DATA | ASSOCIATED KEYWORD | THE NUMBER OF ASSOCIATED DATA | CORRES-PONDING ADDRESS LA |
|---|---|---|---|---|
| 4200 | 4321 | NOMURA | 4 | 0 |
| | | | | |

DMD

| CORRESPONDING ADDRESS LA | ADDRESS OF ASSOCIATED DATA | FLAG F2 |
|---|---|---|
| 0 | A000 | 1 |
| 0 | 6100 | 1 |
| 0 | 4900 | 1 |
| 0 | 3900 | 1 |
| | | |

FIG.27

DM

DMA

| ADDRESS | MANAGEMENT AREA | ICON |
|---|---|---|
| 3800～47FF | RECEIVED MESSAGE AREA | |
| 4800～57FF | TELEPHONE NUMBER DIRECTRY AREA | |
| 5800～97FF | SCHEDULE DATA AREA | |
| 9800～DFFF | MEMO DATA AREA | |

DMB

| SEARCH OBJECT DATA IN RECEIVED MESSAGE | EXECUTION FLAG F1 |
|---|---|
| FOUR DIGITS OF NUMERAL (SENDER CODE) | 1 |
| RECEPTION DAY AND TIME | 0 |
| KEYWORD 1 | 0 |
| ⋮ | ⋮ |

DMC

| ADDRESS OF RECEIVED MESSAGE | DETECTION DATA | ASSOCIATED KEYWORD | THE NUMBER OF ASSOCIATED DATA | CORRES-PONDING ADDRESS LA |
|---|---|---|---|---|
| 3900 | 4321 | NOMURA | 3 | 0 |
| | | | | |

DMD

| CORRESPONDING ADDRESS LA | ADDRESS OF ASSOCIATED DATA | FLAG F2 |
|---|---|---|
| 0 | A000 | 1 |
| 0 | 6100 | 1 |
| 0 | 4900 | 1 |
| | | |

DME

| ICON | LABEL NAME | ADDRESS |
|---|---|---|
| | MOUNTAIN | 5100 |
| | | 8800 |
| | | 4500 |
| | OFF TIME | 4200 |
| | | 4500 |
| | | 6500 |
| ⋮ | ⋮ | ⋮ |

FIG.31

162

| APPLICATION PROGRAM | MINIMUM BYTES REQUIRED FOR EXECUTION OF PROGRAM |
|---|---|
| TELEPHONE NUMBER DIRECTRY | 32 |
| SCHEDULE | 64 |
| MEMO | 16 |
| READING OF RECEIVED MESSAGE | 16 |

FIG.32

RM'

| ADDRESS | RECEPTION ADDRESS | RECEIVED MESSAGE CONTENTS | RECEPTION DAY AND TIME | FLAG F30 | UNCONFIRMATION FLAG F31 | DATA VOLUME (BYTE) |
|---|---|---|---|---|---|---|
| 3800 | A | I RETURNED FIRST. | 97. 11. 11 17:00 | 0 | 0 | 16 |
| 3900 | A | I WILL ATTEND MEETING. | 97. 11. 12 10:00 | 1 | 1 | 18 |
| 4000 | A | I WILL SEND YOU MAIL. | 97. 11. 12 15:00 | 0 | 0 | 24 |
| 4100 | A | PLEASE CALL ME. | 97. 11. 13 17:00 | 1 | 0 | 16 |
| | | | | | | |

FIG.33

TL'

| ADDRESS | TELEPHONE NUMBER | LOWER FOUR DIGITS | NAME | PRIVATE DATA (ADDRESS ETC.) | FLAG F4 | DATA VOLUME (BYTE) | REGISTRATION DAY AND TIME |
|---|---|---|---|---|---|---|---|
| 4800 | 123-456- | 7890 | ICHIRO SATO | PRIVATE DATA 1 | 0 | 50 | 96. 04. 04 |
| 4900 | 098-765- | 4321 | TAROU NOMURA | PRIVATE DATA 2 | 1 | 52 | 97. 01. 30 |
| 5000 | 111-111- | 1111 | HIROKAZU SUZUKI | PRIVATE DATA 3 | 0 | 60 | 97. 06. 30 |
| 5100 | | | | | | | |
| 5200 | | | | | | | |
| .... | .... | .... | .... | .... | .... | .... | .... |
| 5700 | | | | | | | |

FIG.34

SC

| ADDRESS | DAY AND TIME | SCHEDULE CONTENTS | ALARM FLAG | FLAG F5 | DATA VOLUME (BYTE) |
|---|---|---|---|---|---|
| 5800 | 97. 10. 30<br>10:00~12:00 | MARKET RESEARCH FOR METROPOLITAN AREA A | 1 | 1 | 60 |
| 5900 | 97. 11. 04<br>10:00~12:00 | MARKET RESEARCH FOR METROPOLITAN AREA B | 1 | 1 | 60 |
| 6000 | 97. 11. 11<br>10:00~12:00 | MARKET RESEARCH FOR METROPOLITAN AREA C | 1 | 0 | 60 |
| 6100 | 97. 11. 12<br>13:00~15:00 | MEETING FOR MARKET RESEARCH<br>(MEMBERS:MR.TANAKA,MR.SHIMIZU,MR.NOMURA) | 1 | 1 | 72 |
| 6200 | 97. 11. 18<br>10:00~12:00 | MARKET RESEARCH FOR KANSAI AREA C | 1 | 0 | 64 |
| .... | .... | .... | .... | .... | .... |

FIG.35

MM

| ADDRESS | TITLE NO. | CONTENTS OF MEMO | REGISTRATION DAY AND TIME | FLAG F6 | DATA VOLUME (BYTE) |
|---|---|---|---|---|---|
| 9800 | TITLE 1 | MEMO DATA 1 | 97. 03. 30 | 0 | 72 |
| A000 | NEXT MEETING | DON'T FORGET TO GET '98 CATALOG OF Z COMPANY BY NEXT MEETING (FROM MR.NOMURA) | 97. 05. 07 | 1 | 80 |
| A200 | TITLE 2 | MEMO DATA 2 | 97. 07. 10 | 1 | 96 |
| A400 | TITLE 3 | MEMO DATA 3 | 97. 08. 01 | 0 | 80 |
| A600 | TITLE 4 | MEMO DATA 4 | 97. 10. 30 | 0 | 64 |
| . . . . | . . . . | . . . . | . . . . | . . . . | . . . . |

FIG.36

DM'

DMA

| ADDRESS | MANAGEMENT AREA | ICON |
|---|---|---|
| 3800~47FF | RECEIVED MESSAGE AREA |  |
| 4800~57FF | TELEPHONE NUMBER DIRECTRY AREA |  |
| 5800~97FF | SCHEDULE DATA AREA |  |
| 9800~DFFF | MEMO DATA AREA |  |

DMB

| SEARCH OBJECT DATA IN RECEIVED MESSAGE | EXECUTION FLAG F1 |
|---|---|
| FOUR DIGITS OF NUMERAL (SENDER CODE) | 1 |
| RECEPTION DAY AND TIME | 0 |
| KEYWORD 1 | 0 |
| ⋮ | ⋮ |

DMC

| ADDRESS OF RECEIVED MESSAGE | DETECTION DATA | ASSOCIATED KEYWORD | THE NUMBER OF ASSOCIATED DATA | CORRES-PONDING ADDRESS LA |
|---|---|---|---|---|
| 3900 | 4321 | NOMURA | 3 | 0 |
| | | | | |

DMD

| CORRESPONDING ADDRESS LA | ADDRESS OF ASSOCIATED DATA | FLAG F2 |
|---|---|---|
| 0 | A000 | 1 |
| 0 | 6100 | 1 |
| 0 | 4900 | 1 |
| | | |

DMF

| PRIORITY OF WINDOW DISPLAY | FLAG W |
|---|---|
| THE NUMBER OF BYTES FOR EXECUTING APPLICATION | 1 |
| DATA VOLUME | 0 |
| SCHEDULE START DAY AND TIME/ REGISTRATION DAY AND TIME/ RECEPTION DAY AND TIME | 0 |

FIG.37

MESSAGE DATA RECEPTION DEVICE AND METHOD FOR CONTROLLING DISPLAY OF MESSAGE DATA ITEMS AND OTHER DATA ITEMS RELATED TO THE MESSAGE

BACKGROUND OF THE INVENTION

The present invention relates to a data processing device, data display system, data display method, and storage medium, and more particularly to a data processing device and data display system with a data communication function and a data display method for the data processing device and data display system.

Recently, a portable data processing device with the data communication function has been popularized, which is represented by a paging receiver with the electronic notebook function.

The data processing device with a function like this has a lot of keys and a large display screen while giving importance to portability, and has a wide variety of functions, such as the various types of functions as an electronic notebook (telephone directory, schedule, memo, and the like), a message creation function to create a long message including Chinese characters (Kanji) and the like, and the data communication function by a wired/wireless modem and by means of infrared rays or DTMF signal output.

In this type of data processing device, the display screen is larger when compared with a conventional pager, and therefore, a long message can fully be displayed at one time.

There is another portable data processing device, which has a function to shift the display to a display of the personal data associated with the sender who has sent the message or the data associated with the matters included in the message data, by performing a necessary key operation from the message display screen of the received electronic mail, in the case where the data communication function is applied to the communication of the electronic mail.

However, the shift from the display of the above mentioned received message to the display screen of another data associated with the received message, includes a shift to a mode associated with the other data.

Accordingly, for each shift of the display, the CPU must start up an application program corresponding to the other data.

Recently, in order to achieve the speed up of a processing like this, such a method that the application program is temporarily made to be resident in the memory so as to reduce the time required for the start up, has also been adopted, but when the displays of a plurality of associated data are shifted, a plurality of corresponding application software must be resident, and the load for the processing of the CPU is extremely large.

Therefore, even if a plurality of operative application software are provided, such a display shifting function as mentioned above could not always achieve a comfortable operation, depending on the performance of the CPU, the display performance in which the importance is given to the portability, and besides, the operational environment.

BRIEF SUMMARY OF THE INVENTION

Accordingly, it is an object of the present invention to provide a data processing device, data display system, or data display method with the data communication function by which other data whose contents are associated with those of the message can be retrieved and displayed by a simple operation without giving any load to an internal processing.

Another object of the present invention to provide a storage medium for storing a computer program for the above data processing device, data display system, or data display method.

According to the present invention, there is provided a data processing device comprising first storing means for storing plural items of data, means for detecting input of data, first display means for displaying input data which is detected by the detecting means, means for searching the plural items of data stored in the first storing means to detect associated data corresponding to displayed data, means for adding identification data to the associated data corresponding to displayed data, second display means for displaying the identification data added to the associated data corresponding to displayed data, means for selecting identification data corresponding to a desired associated data, and means for controlling the first display means to replace the input data supplied to the first display means with the desired associated data corresponding to the identification data selected by the selecting means.

According to the present invention, there is provided a data display system comprising first storing means for storing plural items of data, means for detecting input of data, first display means for displaying input data which is detected by the detecting means, means for searching the plural items of data stored in the first storing means to detect associated data corresponding to displayed data, means for adding identification data to the associated data corresponding to displayed data, second display means for displaying the identification data added to the associated data corresponding to displayed data, means for selecting identification data corresponding to a desired associated data, and means for controlling the first display means to replace the input data supplied to the first display means with the desired associated data corresponding to the identification data selected by the selecting means.

The identification data is identification number.

The first storing means comprises second storing means for storing type data defining a type of the input data and the second displaying means displays the type data as the identification data.

The data processing device or the data display system further comprises a third storing means for storing plural items of control data for editing the data stored in the first storing means and corresponding to plural types of the associated data, means for instructing edition of the associated data displayed by the second display means, means for discriminating a type of the associated data of which edition is instructed by the instructing means, and means for reading from the third storing means the control data corresponding to the type of the associated data discriminated by the discriminating means and editing the associated data based on the control data.

The first display means comprises means for displaying a first window including the input data and the controlling means comprises means for replacing the input data supplied to the first display means with the desired associated data corresponding to the identification data selected by the selecting means.

The data processing device or the data display system further comprises means for instructing edition of the associated data displayed by the second display means, and means for editing the associated data displayed by the second display means.

The data processing device or the data display system further comprises means for connecting to a communication network and in which the detecting means detecting input of data supplied from the communication network.

The first storing means stores the plural items of data and corresponding keyword data which is searched by the searching means, and the searching means comprises means for determining whether or not the input data includes a keyword.

The first storing means stores the plural items of data and corresponding information data indicating that the item of data is data to be displayed as the associated data, and the searching means searches the items of data which are indicated the data to be displayed as the associated data by the information data.

According to the present invention, there is provided a storage medium for storing a computer program which is readable by a computer connected to storing means for storing plural items of data and display means for displaying the data, the computer program comprising a program code for detecting input of data, a program code for displaying input data, a program code for searching the plural items of data stored in the storing means to detect associated data corresponding to displayed data, a program code for adding identification data to the associated data corresponding to displayed data, a program code for displaying the identification data added to the associated data corresponding to displayed data, a program code for selecting identification data corresponding to a desired associated data among displayed identification data, and a program code for controlling the first display means to replace the input data supplied to the first display means with the desired associated data corresponding to the identification data selected by the selecting means.

According to the present invention, there is provided a data display method of an apparatus having storing means for storing at least data and display means for displaying the data, the method comprising the following steps of detecting input of data, display input data by the display means, searching the plural items of data stored in the first storing means to detect associated data corresponding to displayed data, adding identification data to the associated data corresponding to displayed data, displaying the identification data added to the associated data corresponding to displayed data, selecting identification data corresponding to a desired associated data among displayed identification data, and controlling the display means to replace the input data supplied to the display means with the desired associated data corresponding to the identification data selected at the selecting step.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 shows the arrangement and the stored contents of the received message memory area RM in FIG. 2;

FIG. 4 shows the arrangement and the stored contents of the telephone number directory memory area TL in FIG. 2;

FIG. 5 shows the arrangement and the stored contents of the schedule data memory area SC in FIG. 2;

FIG. 6 shows the arrangement and the stored contents of the memo data memory area MM in FIG. 2;

FIG. 7 shows the arrangement of the register in the CPU in FIG. 1;

FIG. 10 shows the change of the stored contents of the received message memory area RM by the operation according to the first embodiment;

FIG. 11 shows the stored contents of the register in the CPU by the operation according to the first embodiment;

FIG. 16 shows the arrangement and the stored contents of the data managing memory area DM in FIG. 15;

FIG. 17 shows the arrangement and the stored contents of the received message memory area RM in FIG. 15;

FIG. 18 shows the arrangement and the stored contents of the telephone number directory memory area TL in FIG. 15;

FIG. 19 shows the arrangement and the stored contents of the schedule data memory area SC in FIG. 15;

FIG. 20 shows the arrangement and the stored contents of the memo data memory area MM in FIG. 15;

FIG. 26 shows the change of the stored contents of the received message memory area RM by the operation according to the second embodiment;

FIG. 27 shows the change of the stored contents of the data managing memory area DM by the operation according to the second embodiment;

FIG. 31 shows another arrangement and other stored contents of the data managing memory area DM according to the second embodiment;

FIG. 32 shows the stored contents of the application program memory 162 according to a third embodiment of the present invention;

FIG. 33 shows the arrangement and the stored contents of the received message memory area RM' in FIG. 15 according to the third embodiment;

FIG. 34 shows the arrangement and the stored contents of the telephone number directory memory area TL' in FIG. 15 according to the third embodiment;

FIG. 35 shows the arrangement and the stored contents of the schedule data memory area SC in FIG. 15 according to the third embodiment;

FIG. 36 shows the arrangement and the stored contents of the memo data memory area MM in FIG. 15 according to the third embodiment;

FIG. 37 shows the arrangement and the stored contents of the data managing memory area DM' in FIG. 15 according to the third embodiment;

DETAILED DESCRIPTION OF THE INVENTION

A preferred embodiment of a data processing device, data display system, and data display method according to the present invention will now be described with reference to the accompanying drawings.

First Embodiment

The first embodiment in the case where the present invention is applied to a paging receiver which has the function of an electronic notebook and conforms to communication standard RCRSTD-43, will be described below by referring to drawings.

Figure 1:
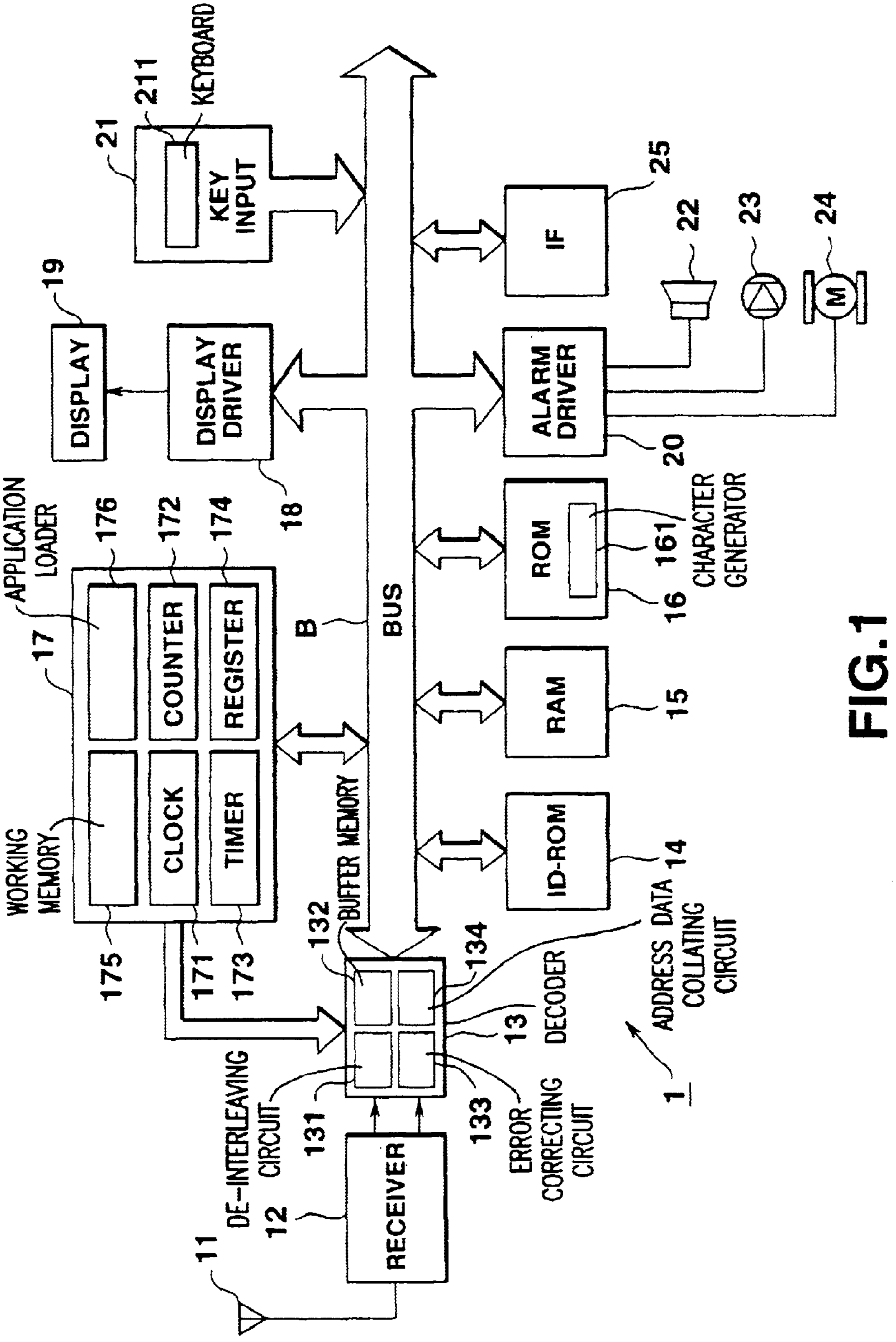
FIG. 1 is a block diagram showing the circuit arrangement according to a first embodiment of the present invention.

FIG. 1 shows the circuit arrangement of the first embodiment. A paging receiver 1 comprises an antenna 11, a receiver 12, a decoder 13, an ID-ROM 14, a RAM 15, a ROM 16, a CPU 17, a display driver 18, a display 19, an alarm driver 20, a key input 21, a speaker 22, an LED 23, a vibrator 24, and an IF (interface) 25. The decoder 13, ID-ROM 14, RAM 15, ROM 16, CPU 17, display driver 18, alarm driver 20, key input 21, and IF 25 are connected by a bus line B. The display 19 comprises, for example, a liquid crystal display panel which is driven by the display driver 18. The speaker 22, LED 23, and vibrator 24 are driven by the alarm driver 20 to perform alarming.

The antenna 11 receives data (frame data) sent from a wireless base station (not shown), and outputs the data to the receiver 12. The receiver 12 is connected to the decoder 13, and is driven on the basis of a control signal from the decoder 13 to demodulate and detect the received data. The receiver 12 respectively outputs the data in the case of being received binary level modulation data and four-level modulation data by taking in a synchronous portion in the data.

The decoder 13 includes a de-interleaving circuit 131, a buffer memory 132, an error correcting circuit 133, and an address data collating circuit 134.

The binary level modulated or four-level modulated digital data input from the receiver 12 is rearranged into parallel data of 8 bits, and is output to the bus line B.

The address data received by the address data collating circuit 134 and the address data previously registered in the ID-ROM 14 are collated. When the coincidence is detected, the address data collating circuit 134 issues a command to the receiver 12 so that the receiving operation may be continued.

The de-interleaving circuit 131 in the decoder 13 rearranges or de-interleaves the parallel data obtained by the receiver based on the modulation mode and a transmission speed of the received signal, and obtains the one frame data. The obtained data is temporarily stored in the buffer memory 132. A BCH code of the one frame data is further decoded to perform an error correction. Message data including a sender code (numerical data of the lower 4 digits of the telephone number of the sender) is extracted.

The ID-ROM 14 stores a frame No. to be received by the paging receiver 1, address data (code word) of 32 bits, vector type data of 3 bits, contents of various settings, contents of display control, call number, and the like in a correlated manner.

Figure 2:
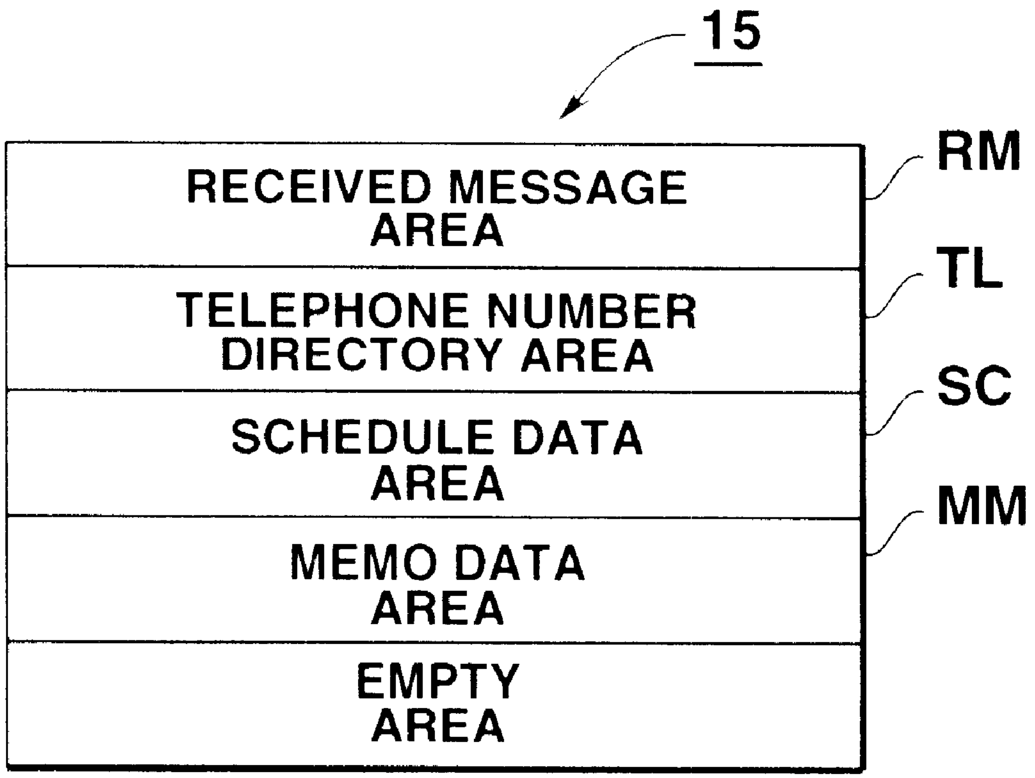
FIG. 2 shows the memory area arrangement of the RAM in FIG. 1.

As shown in FIG. 2, the RAM 15 comprises plural memory areas, i.e., a received message area RM for storing the received message, a telephone number directory area TL for storing a plurality of personal data including telephone numbers and names, a schedule data area SC for storing schedule data, and a memo data area MM for storing memo data as the function of an electronic notebook, and empty area. The RAM 15 is formed of an EEPROM and the contents thereof are kept to be stored regardless of the feeding state of the electric power depending on an operation of a power supply key provided in the key input 21, or the like.

The received message area RM, whose stored contents are shown in FIG. 3, is an area which stores a plurality of received message data each comprising a storing address, a reception address, received message contents, a sender code flag, a sender code (lower four digits of telephone number), and a reception day and time.

The sender code flag is set to "1" in the case where numerical data of 4 digits expressing the sender is additionally set at the end of the received message data together with the specified mark, for example, "] ]" and the name corresponding to the numerical data is registered in the telephone number directory area TL. When the sender code flag is set to "1," the additionally set numerical data of 4 digits is set to the sender code.

The telephone number directory area TL, whose stored contents are shown in FIG. 4, is an area which stores a plurality of personal data each comprising a storing address, a telephone number, a name, and private data. A character string comprising kana(Japanese Character)/kanji, alphanumeric characters, and the like is stored in the telephone number directory area TL as character data according to the data input from the key board 211 of the key input 21 or the data input from the IF 25. The private data is arranged to set, for example, an address, a birthday, an office, and the like by an arbitrary character string.

The schedule data area SC, whose stored contents are shown in FIG. 5, is an area which stores a plurality of schedule data each comprising a storing address, day and time, schedule contents, and an alarm setting flag showing whether an alarm operation should be performed or not. The data input from the key board 211 of the key input 21 or the schedule data input from the IF 25 is stored in the schedule data area SC.

The memo data area MM, whose stored contents are shown in FIG. 6, is an area which stores a plurality of memo data each comprising a storing address, a title, and memo contents. The memo data input from the key board 211 of the key input 21 or the memo data input from the IF 25 is stored in the memo data area MM.

The ROM 16 stores various types of programs and various types of data for operating the CPU 17, and comprises an EEPROM.

To be more specific, these respective programs and various types of data include a shift control program for an operation mode (telephone number directory mode, schedule mode, and memo mode) on the basis of the data input from the key board 211 of the key input 21, an application program, a viewer (one of application programs, which is loaded only for the display of the data registered in each mode. When the viewer is operated, input/editing is impossible, and at the time of start up of the data processing device, the viewer is loaded by giving comparatively a little load to the working memory), and a character generator 161 which displays kana-kanji, alphanumeric characters, and the like, or stores them in the areas for the electronic notebook function of the RAM 15 on the basis of the data input from the key board 211 provided in the key input 21.

The CPU 17 contains a clock 171, a counter 172, a timer 173, a register 174, a working memory 175, and an application loader 176, and controls the total operation of the paging receiver 1 according to the control program stored in the ROM 16, and further, controls the storage and display operation of the data, to be described later.

The clock 171 always counts the present time, and detects the reception day and time of the message data, the registration time of other modes, the start/end time of the schedule data, and the like, which are respectively stored in the correlated manner.

Figure 7:
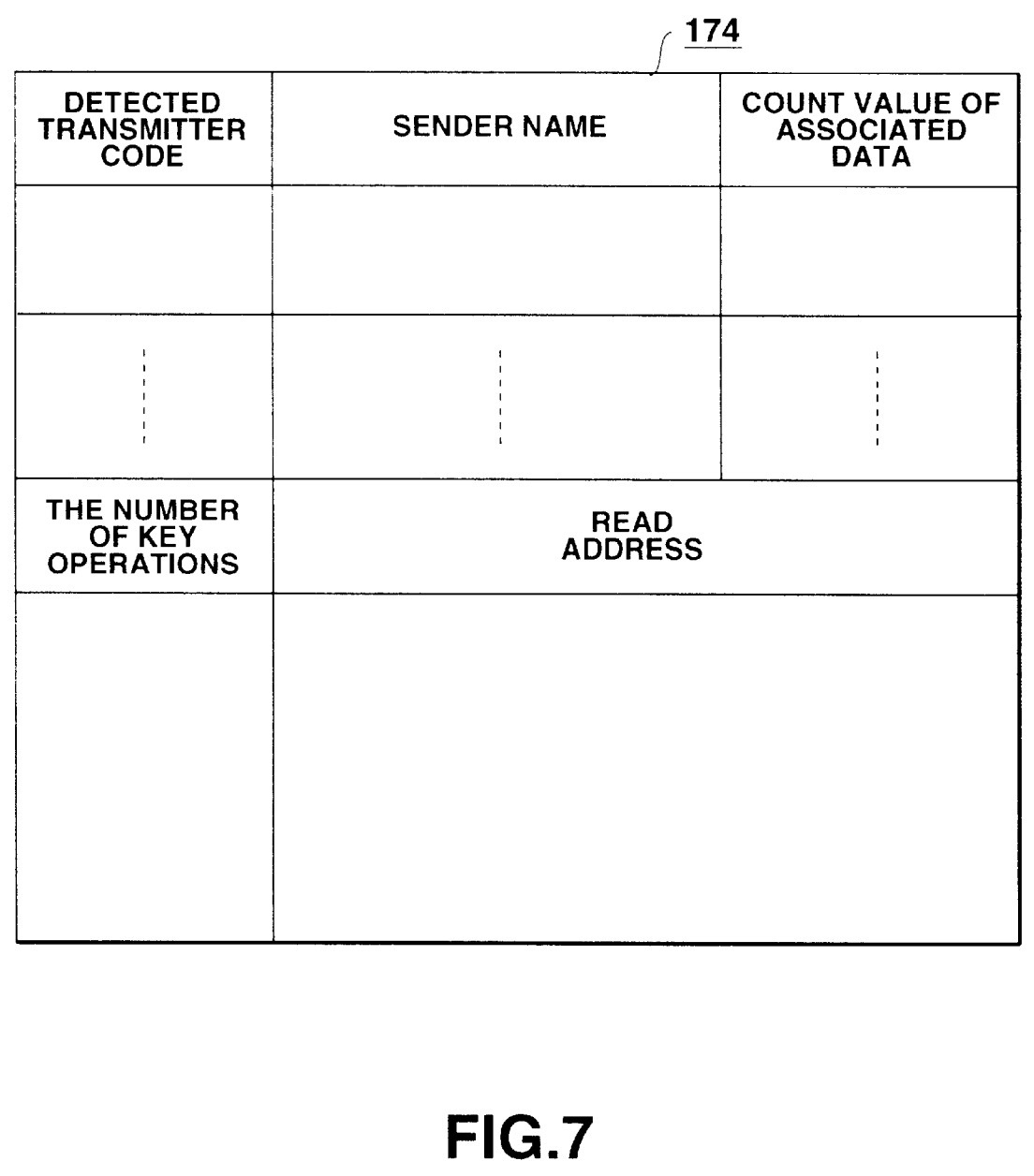

Furthermore, as shown in FIG. 7, the register 174 stores a plurality of sets of data, wherein one set of data is made of the name of the sender corresponding to the sender code detected from the received message and the count value of the associated message data, and further stores the number of times of key operations by the display shift key to be described later and the read out address as a set.

Furthermore, the application loader 176 has a function to load, in the case where the mode shift instruction is detected from the key input 21, the corresponding application software and viewer from the ROM 16 to the working memory 175 of the CPU 17.

The display driver 18 drives the display 19 to display the received message and other data.

The alarm driver 20 drives the speaker 22 which informs of receiving the message by sound, the LED 23 which informs of receiving the message by lighting or flashing, and the vibrator 24 which informs of receiving the message by vibration, under the control of the CPU 14.

The key input 21 has the key board 211 which comprises various types of character input keys for inputting kana-kanji and alphanumeric characters, as well as a power supply key, a mode shift key, a reset key, and a display shift key for changing the display screen.

The IF 25 is a circuit which sends and receives the data to and from the external electronic equipment by using the data cable, the infrared rays, and the like as the transmitting medium, on the basis of the control from the CPU 17, and has a buffer for temporarily storing the transmitting data and the received data.

Next, the operation of the embodiment will be described.

Figure 8:
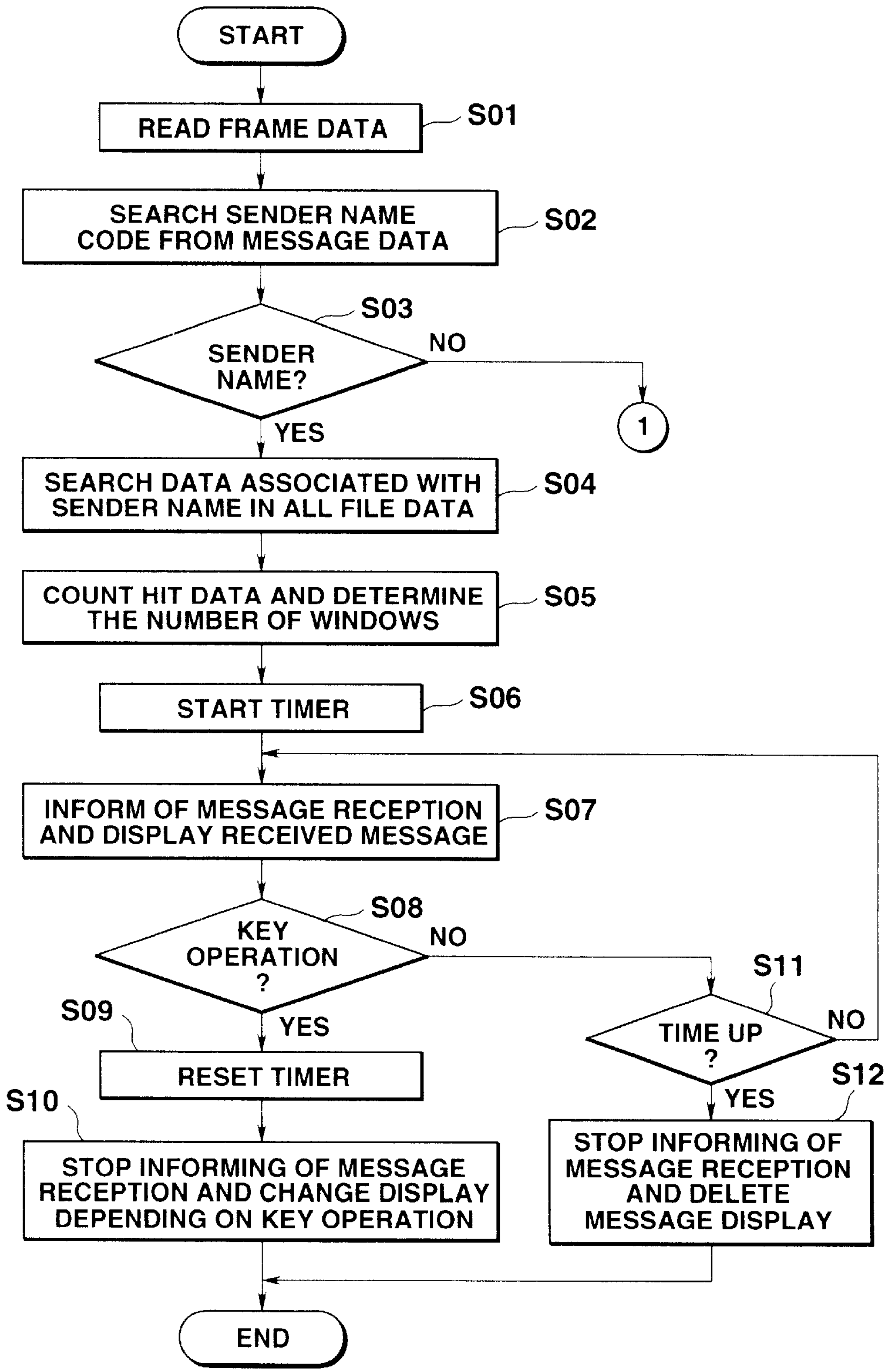
FIG. 8 is a flow chart explaining the operation at the time of receiving the message according to the first embodiment.
Figure 9:
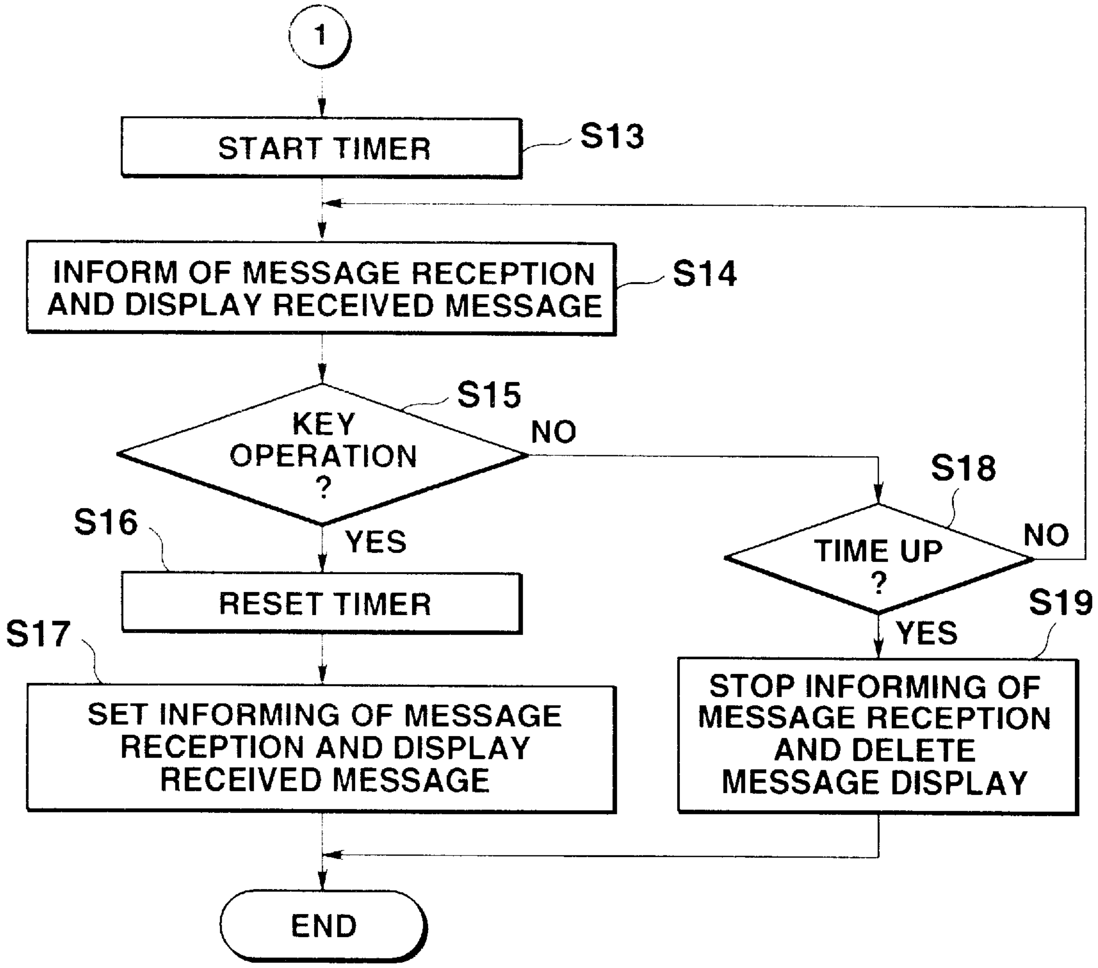
FIG. 9 is a flow chart explaining the operation at the time of receiving the message according to the first embodiment.

FIG. 8 and FIG. 9 show the contents of such a series of processing by the CPU 17 in which message data to the own equipment is received, the received data is stored and finally is displayed and reported if needs arise. At first, data of one frame conforming to the frame No. and address data stored in the ID-ROM 14 is taken into the decoder 13 in the state of intermittent receiving in synchronization with the received radio waves (step S01).

The data taken in the decoder 13 is demodulated and subjected to the data processing (temporary storing in the buffer memory 132, rearrangement of the received data by the de-interleaving circuit 131, error correcting processing of the received data by the error correcting circuit 133, and coincident determination of the address data by the address data collating circuit 134), and the message data in the message field of the received data is stored in the received message area RM of the RAM 15.

In the case where the above mentioned specified mark "] ]" and the numerical data of 4 digits showing the sender are added at the end of the message data, "1" is set to the corresponding sender code flag of the received message area RM, and after setting the numerical data of 4 digits as the sender code, personal data conforming in lower 4 digits of the telephone number is retrieved from the telephone number directory area TL of the RAM 15 by using that numerical code of 4 digits (step S02), and it is determined whether the personal data of the corresponding sender exists or not (step S03).

FIG. 10 shows the state where new received message data is stored in the received message area RM, and here, the state is shown, where in the storing address "0400," a message data whose received message contents are "I drafted meeting report" is stored as received message data together with the reception day and time "97.11.15 17:00" obtained by the clock 171 in the CPU 17.

The sender code flag in the received message data is set to "1" and the numerical-data of 4 digits "4321" is set at the sender code, and therefore, it is understood that the sender code is additionally set following the message contents of "I drafted meeting report" in the received message.

Then, by retrieving the lower 4 digits of the telephone number of the personal data stored in the telephone number directory area TL using the sender code, it is understood that as shown in FIG. 4, the personal data of the sender, that is, a storing address "1100," a telephone number "098-765-4321," a name "Taro NOMURA," and private data "private data 2 (contents are not specifically described)," is stored.

If it is determined at step S03 that the personal data of the corresponding sender exists, the data associated with the sender is retrieved from all file data of the RAM 15 shown in FIG. 3 to FIG. 6, by using the sender code "4321," and the names "NOMURA" and "Taro NOMURA" as the key words (step S04), and the storing address of the data which conforms as the result of the retrieving, is stored in the register 174 in the CPU 17 as a read-out address. In the meantime, the number of items of data is counted by the counter 172 in the CPU 17 so that the number of items of windows to be displayed is determined, and it is stored in the register 174. Furthermore, because of detecting that there is data which conforms as the result of the retrieving, the application loader 176 reads out the viewer from the ROM 16, and loads it in the working memory 175 (step S05).

FIG. 11 shows the storing state of the register 174 in the CPU 17 at this moment. The detected sender code "14321" and sender name "Taro NOMURA" are stored together with the count value "4" of the associated data, and the storing address "0400" of the lately received message data stored in the received message area RM as the readout address, and each of the storing addresses "0100," "1100," "2300," "8100" of the associated data obtained by the retrieving are stored.

In this case, by summing up the received message data and the count value "4" of the associated data obtained by the retrieving, the number of items of data, that is, the number of items of windows to be displayed becomes "5," and therefore, the numbers of times of key operations of the display shift key of the key input 21 corresponding to the respective readout addresses are respectively remainder numbers of "5" of "5N (N is a natural number)," "5N+1," 5N+2," "5N+3," "5N+4".

After that, while starting the clocking of the specified time of the receiving informing by the timer 173 in the CPU 17 (step S06), at least one of the speaker 22, LED 23, and vibrator 24 which are previously set is driven by the alarm driver 20 so as to inform of the reception of the message. At the same time, the displays in which the head end is the window of the received message data are performed in the display 19 by the display driver 18 (step S07).

Figure 12:
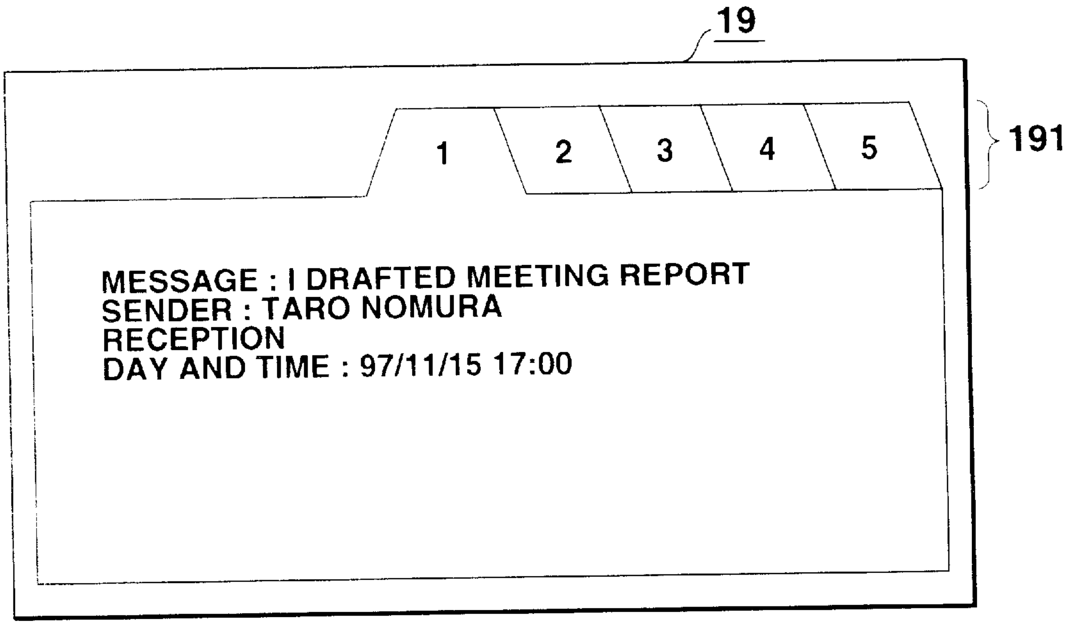
FIG. 12 shows the display screen by the operation according to the first embodiment.

FIG. 12 shows the display screen of the display 19 at this moment, and expresses such an image that the message contents "I drafted meeting report," the sender "Taro NOMURA," and the reception day and time "97.11.15 17:00" are indicated as the received message data, on the card (window display type) having the heading of "1" and positioned at the head end, among 5 cards having headings of "1" to "5" displayed on label display section 191.

In this case, the shown received message data is read out of the received message area RM of the RAM 15, on the basis of the read out address "0400" corresponding to the number "5N" of times of key operations stored in the register 174.

After this display, by repeatedly determining whether any one of the keys in the key input 21 has been operated or not (step S08), or whether or not the timer 173 in the CPU 17 has finished the clocking of the specified time to perform the receiving report (step S11), the operation of the display shift key and the time up of the timer 173 are waited for.

Then, in the case where it is determined in step S08 that any one of keys of the key input 21 has been operated, it means that a key operation has been performed within the specified time to perform the receiving report, and therefore, after resetting the clocking operation by the timer 173 (step S09), the report caused by driving at least one of the speaker 22, LED 23, and vibrator 24 with the alarm driver 20, is stopped, and at the same time, only in the case where the operated key is the display shift key, the read out address corresponding to the number of times of operations of that display shift key is obtained from the register 174, and the viewer reads out the data stored in the corresponding storing address, from any one of the received message area RM, telephone number directory area TL, schedule data area SC, and memo data area MM, and displays the data by shifting the state from the display state of the received message data at step S07 (step S10), and the processing is finished.

Figure 13:
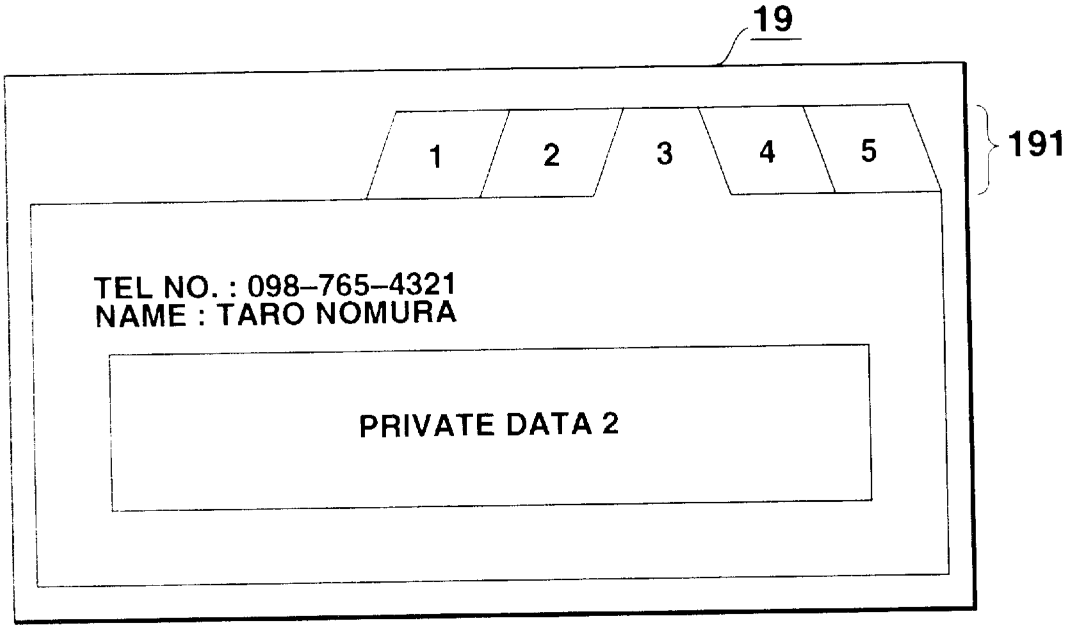
FIG. 13 shows the display screen by the operation according to the first embodiment.

FIG. 13 shows a display screen in the case where the display shift key of the key input 21 is continuously operated two times from the state of the display screen shown in FIG. 12. In this case, an image is shown, in which the telephone number "098-765-4321," the name "Taro NOMURA," and the private data "private data 2" are indicated as the personal data read out from the telephone number directory area TL, on the card having the heading of "3" among 5 cards having headings of "1" to "5" displayed on the label display section 191.

The personal data displayed here is read out on the basis of the read out address "1100" corresponding to the number "5N+2" of times of key operations stored in the register 174.

Furthermore, in the case where it is determined at step S11 that the timer 173 in the CPU 17 has finished the clocking of the specified time to perform the receiving report, it means that the specified time to perform the receiving report has elapsed while any key operation of the key input 21 is not performed, and therefore, the report made by driving at least one of the speaker 22, LED 23, and vibrator 24 with the alarm driver 20, is stopped. At the same time, the display of the received message data in the display 19 as shown in FIG. 12 up to that time, is stopped (step S12), and the processing is finished.

Furthermore, in the case where it is determined at step S03 that there is no personal data of the corresponding sender, it means that there is no personal data in which the lower 4 digits of the telephone number conforms to the numerical code of 4 digits added and set to the received message data from the telephone number directory area TL of the RAM 15, or that primarily, the numerical code of 4 digits is not added and set to the received message data. In any case, the sender cannot be specified from the personal data stored in the telephone number directory area TL. Therefore, the clocking of the specified time of the receiving report by the timer 173 in the CPU 17 is started (step S13), and in the mean time, the presence of the receiving of a message is reported by driving at least one of the speaker 22, LED 23, and vibrator 24 which is previously set by the alarm driver 20, and at the same time, the display of the received message data is performed in the display 19 by the display driver 18 (step S14).

At this moment, it is only the character portion of 3 lines made by eliminating the image corresponding to 5 cards having the headings of "1" to "5," on the label display section 191 from the display contents shown in FIG. 12 that is shown in the display 19.

After the display of the received message data, by repeatedly determining whether or not any key of the key input 21 has been operated (step S15), or whether or not the timer 173 in the CPU 17 has ended the clocking of the specified time to perform the receiving report (step S18), a key operation and the time up of the timer 173 are waited for.

Then, in the case where it is determined at step S15 that a key is operated, it means that a key operation has been performed within the specified time to perform the receiving report, and therefore, after resetting the clocking operation by the timer 173 (step S16), the report made by driving at least one of the speaker 22, LED 23, and vibrator 24 with the alarm driver 20, is stopped, and at the same time, while keeping the display state of the received message data in step S14 (step S17), this processing is finished.

Furthermore, in the case where it is determined at step S18 that the timer 173 in the CPU 17 has ended the clocking of the specified time to perform the receiving report, it means that the specified time to perform the receiving report has elapsed without performing any key operation of the key input 21. Therefore, the report made by driving at least one of the speaker 22, LED 23, and vibrator 24 with the alarm.driver 20, is stopped, and at the same time, the display of the received message data in the display 19 up to that time, is stopped (step S19), and this processing is finished.

Other embodiments of the data processing device according to the present invention will be described. The same portions as those of the first embodiment will be indicated in the same reference numerals and their detailed description will be omitted.

Second Embodiment

In the first embodiment, data to be displayed in the window of other mode can be seen by starting up the viewer program. However, it is impossible to input/edit the window data under the execution of the viewer. It is necessary to stop the viewer and to shift to the other mode to input/edit the window data. In the second embodiment, it is possible to start up the corresponding application program and to directly shift to each mode from the read out mode of the received message data by touching the label display section 191.

The second embodiment in the case where the present invention is applied to a paging receiver which has the function of an electronic notebook and conforms to the standard RCRSTD-43, will be described below by referring to drawings.

Figure 14:
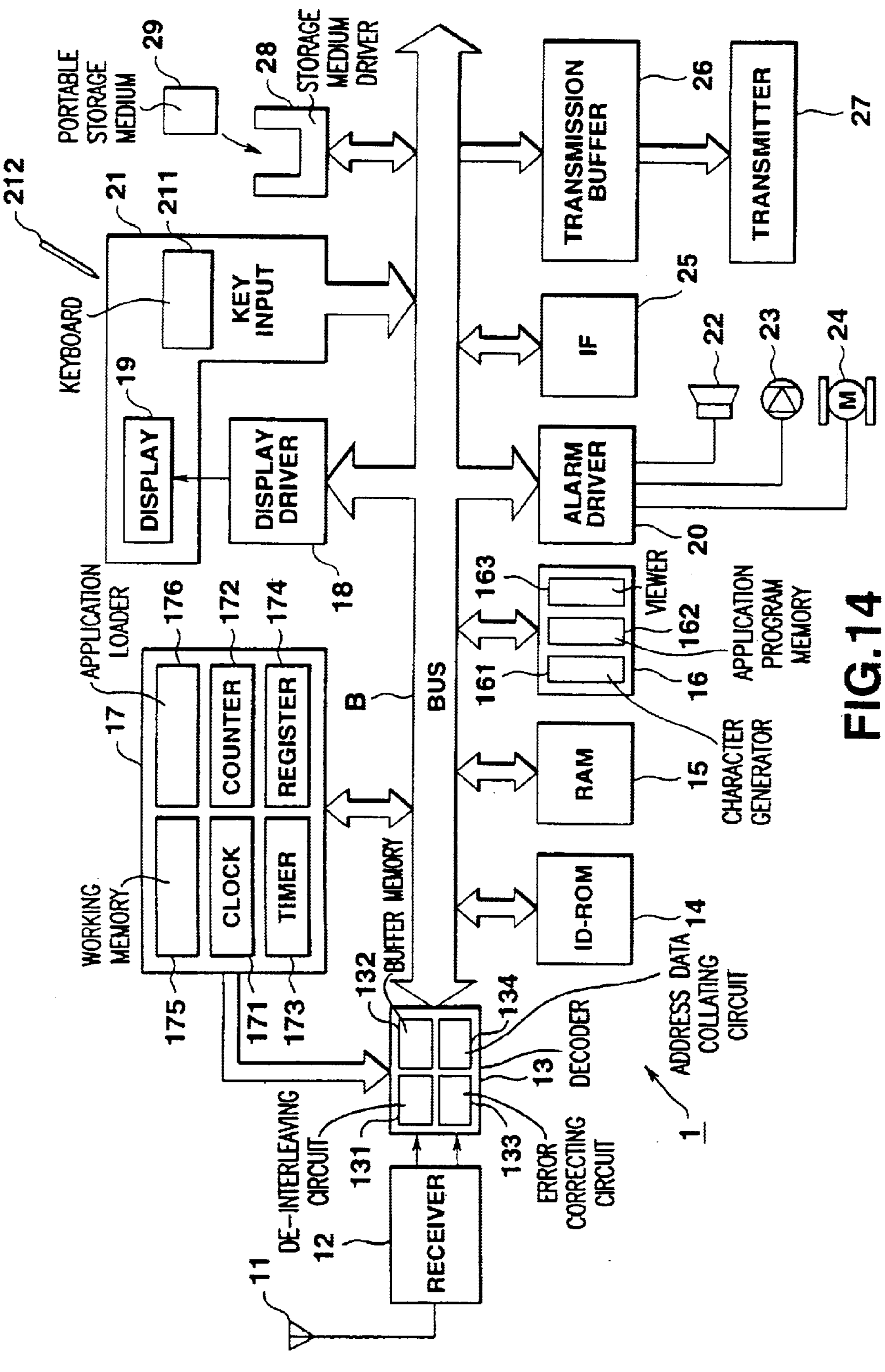
FIG. 14 is a block diagram showing the circuit arrangement according to a second embodiment of the present invention.

FIG. 14 shows the circuit arrangement thereof, which is basically similar to that shown in FIG. 1, and therefore, the same numeral is applied to the same part, and the description thereof will be omitted.

The key input 21 comprises a touch panel provided as one piece on the display 19 and a driving circuit thereof, and with the touching operation using fingers, a specialized stylus pen 212, or the like, it can perform the input of the desired characters, numerals, symbols, and the like, and setting, execution, selective specification, and the like of various types of functions, by the positional specification corresponding to the positions of the key board 211 and the like shown in the display 19, the writing operation, and the like.

A transmission buffer 26 has a function to change the data into a data corresponding to the communication network of sending and to hold that, in the case where the transmission instruction of the data newly created and registered in each mode (especially, in the memo mode), is detected from the key input 21.

A transmitter 27 is a circuit to transmit and output the data stored in the transmission buffer 26, and an example is a modem (including both wired and wireless types), a dialer, or an infrared ray output section.

A storage medium driver 28 is a device for reading out the data stored in a portable storage medium 29 (including a semiconductor memory, a magnetic disk, an optical disk, an optical magnetic disk, or the like), or for writing the data into the portable storage medium 29.

Figure 15:
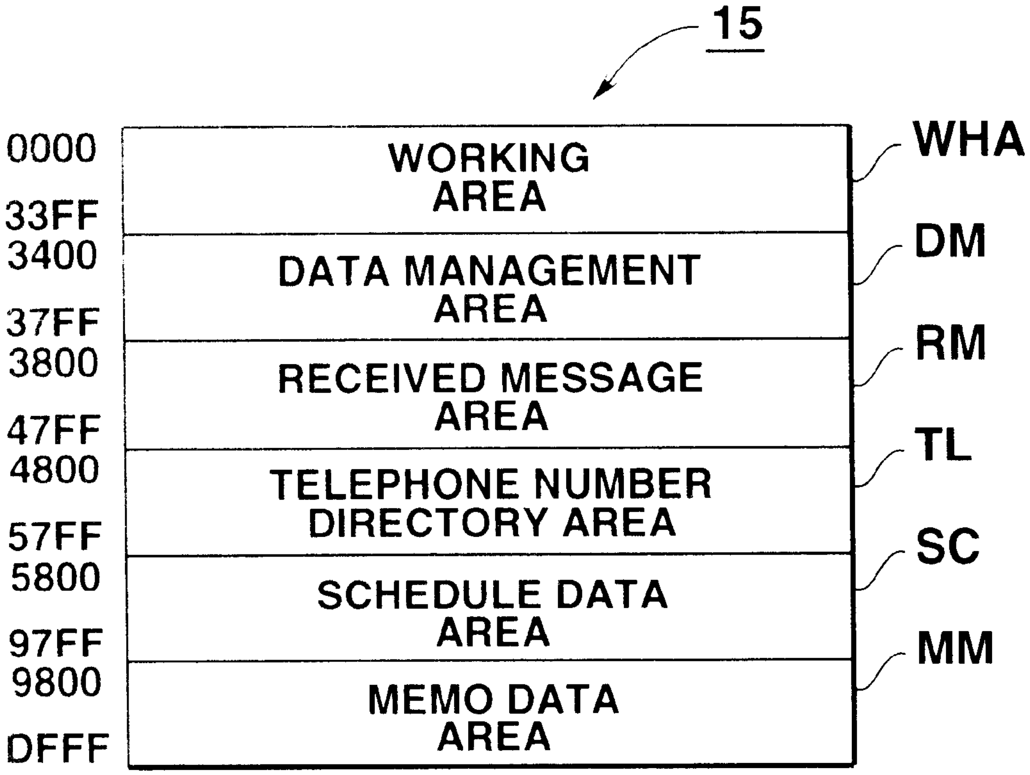
FIG. 15 shows the memory area arrangement of the RAM in FIG. 14.
Figure 21:
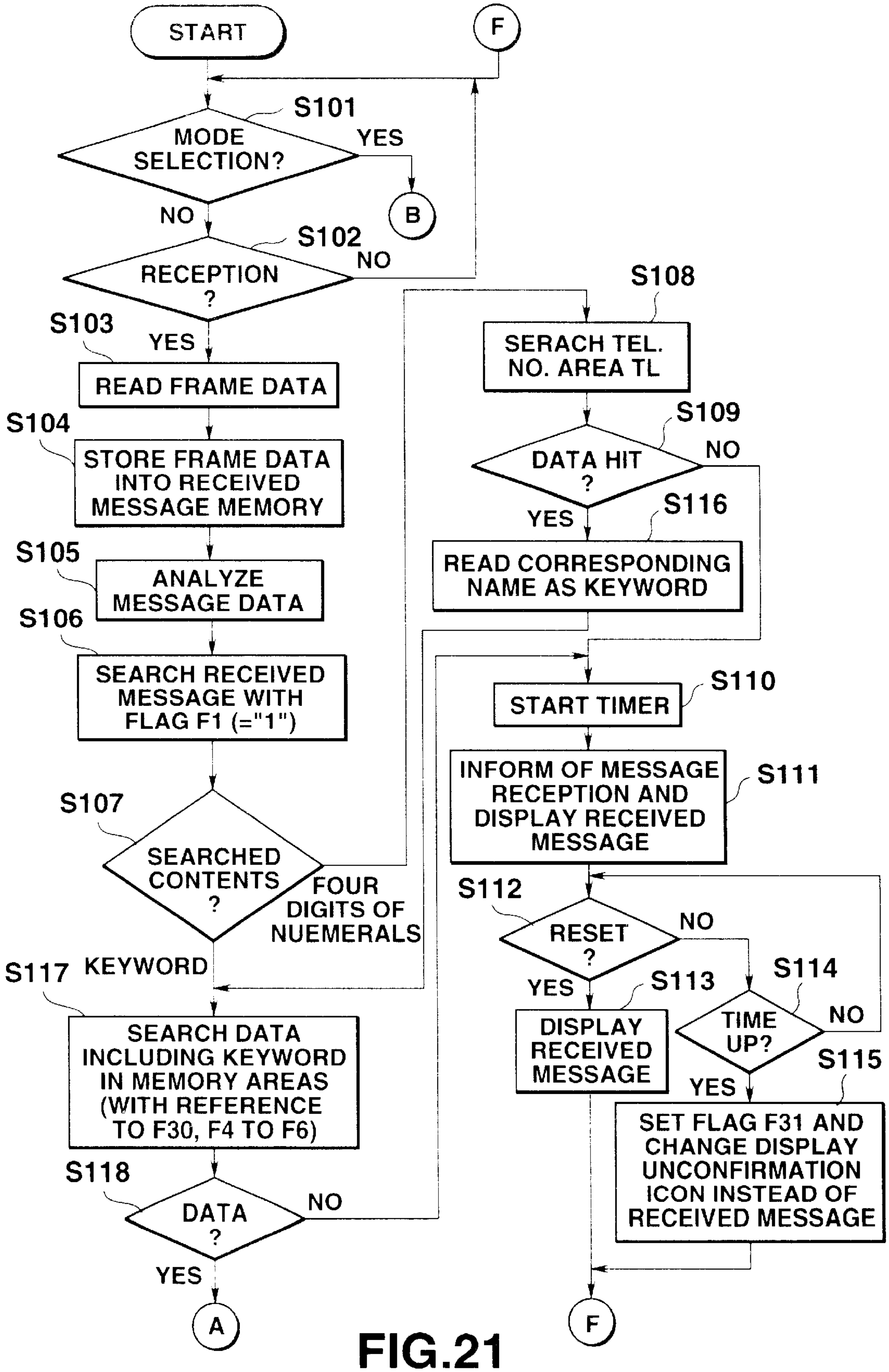
FIG. 21 is a flow chart explaining the operation according to the second embodiment.

The RAM 15 comprises, for example, an EEPROM, and as shown in FIG. 15, includes a working area WHA used during the normal data processing, a data management area DM to be described later, a received message area RM for storing the received message data, a telephone number directory area TL for storing a plurality of personal data including telephone numbers, a schedule data area SC for storing the schedule data, and a memo data area MM for storing the memo data. The address range of each area is shown in the figure, and the contents thereof is kept to be stored regardless of the feeding state of the power supply or the like.

The data management area DM stores the correlation between the message data and each mode data, even if the processing at the time of receiving the message has been finished. As shown in FIG. 16, the data management area DM comprises 4 areas DMA, DMB, DMC, and DMD, and further it stores the display information (an icon picture of the label display section 191) and the like during the window display.

The area DMA stores the icon picture displayed in the label display section 191 of each window together with the management area, during the window display of the data, and at the time of the display of the received message, the viewer reads out and displays the data of the corresponding window by specifying, with a touch, the icon displayed in the label display section 191 of each window.

Furthermore, in the case where the icon displayed in the label display section 191 is specified with a touch continuously two times, the application loader 176 reads out the corresponding application program from the application program memory 162 of the ROM 16 in addition to the viewer 163, and loads it to the working memory 175, and while keeping the window display (that is, while making it possible to refer to the associated data of other modes, because of the loading in advance of the viewer), the shift from the display of the received message to the execution state of each mode to perform referring/input/editing/ deletion of the data, is performed.

The area DMB stores the data which is made to be the retrieving object when the message data is received, and in the first embodiment, merely the retrieving with the numeral of 4 digits (sender code) by displaying the name of the sender, is performed, but in the second embodiment, the retrieving by the reception day and time data, or the data of the key word with a specified character string is also possible, and the data for the retrieving can properly be input and set, and a flag F1 for controlling the execution/ nonexecution of retrieving is stored for that.

The area DMC is an area which stores, in the correlated state, the data detected as the result of the retrieving by using the area DMB when receiving the message data (however, this area is used only in the case of displaying the name of the sender), the related key word common to each mode data, the number of associated data showing the number of windows of the window display of the received message, and the corresponding address LA which defines the link of the data with the associated data storing address to be described later.

The area DMD is an area which stores the storing address of the associated data of each mode linked with the corresponding address LA of the area DMC, and in the meantime, which stores a display flag F2 defining the execution/ nonexecution of the window display of the data during the window display in the state of being correlated to each data.

The received message area RM, whose stored contents are shown in FIG. 17, is an area which stores a plurality of received message data each comprising a storing address, a reception address, received message contents, a reception day and time, a flag F30, and a flag F31.

The flag F30 is used for the control of determining whether or not the registration of the window display as the associated data should be performed, and "1" shows allowance of the window display and "0" shows inhibition of the window display, and it is linked to the flag F2 in order to perform the setting/control associated with the window display at the time of received message display, in each mode.

The flag F31 is provided as a flag forced to be set as the associated data which should be displayed in the case of the unconfirmed message, and "1" shows the unconfirmed message and "0" shows the confirmed message, and when the display of the total message is detected, "0" is set.

Accordingly, in the unconfirmed message, "1" is respectively set to the flag F30 and to the unconfirmation flag F31.

The telephone number directory area TL, whose stored contents are shown in FIG. 18, is an area which stores a plurality of personal data each comprising a storing address, a telephone number, a name, private data, and a flag F4. The private data sets, for example, the address, the birthday, the office, or the like by using an arbitrary character string, by detecting the input operation from the key board 211 of the key input 21, or the selective operation by the stylus pen 212.

The flag F4 is a flag to be used for the control of determining whether or not the window display of the associated data should be performed, similar to the flag F30 of the received message area RM.

The schedule data area SC, whose stored contents are shown in FIG. 19, is an area which stores a plurality of schedule data each comprising a storing address, a day and time, schedule contents, an alarm setting flag showing whether or not the alarm report should be performed, and a flag F5.

The flag F5 performs the same function as those of the flag F2 of the area DMD of the data management area DM, the flag F30 of the received message area RM, and the flag F4 of the telephone number directory area TL.

The memo data area MM, whose stored contents are shown in FIG. 20, is an area which stores a plurality of memo data each comprising a storing address, a title number, memo contents, and a flag F6.

The flag F6 also performs the same function as those of the flags F2, F30, F4, and F5.

In the ROM 16, the application program memory 162 in which the application program used in each mode is stored on the table, and the viewer 163 which starts up when the display of the associated data is instructed in the read out mode of the received message data are stored, as well as the character generator 161 described in the first embodiment.

This shows, in the visually discriminated state, the application program and viewer which are stored in the state of being mixed with the control program stored in the ROM 16 in the first embodiment.

Next, the operation of the second embodiment will be described.

FIG. 21 to FIG. 25 show the processing contents from the state of waiting for the receiving of the message and the selective operation of the mode. At the beginning, by repeatedly determining whether a selective operation of a mode by the key input 21 is detected (step S101), or a receiving of the message data to the own equipment is detected (step S102), the detection is waited for.

Then, when it is determined at step S102 that receiving of the message has been detected, the received frame data is taken in (step S103). In the decoder 13, it is demodulated and subjected to data processing (temporary storage in the buffer memory 132, rearrangement of the received data by the de-interleaving circuit 131, error correcting processing of the received data by the error correcting circuit 133, and address data correspondence determination by the address data collating circuit 134), and the message data in the message field of the received data is stored in the received message area RM of the RAM 15 (step S104).

After that, the message data in the stored frame data is analyzed (step S105).

FIG. 26 shows the state where the new received message data is stored in the received message area RM, and here, a state is shown, where the message data having the received message contents of "I drafted meeting report" is stored in the storing address "4200"as the received message data, together with the reception day and time "97.11.15 17:00" obtained by the clock 171 in the CPU 17. It is assumed that the message of the storing address "3900" is not confirmed and "1" is set to the corresponding unconfirmation flag F31.

On the basis of the analyzed results of the received message data, as for the received message data, retrieving is performed by using such retrieving contents that "1" is set to the flag F1 at the area DMA in the data management area DM (step S106).

In the case it is determined that the retrieving contents are the numeral of 4 digits as shown in FIG. 16 (step S107), retrieving is performed in the telephone number directory area TL by using that numeral of 4 digits, and it is determined whether or not there are any coincident lower 4 digits of the telephone number (step S109).

In the case where there are no coincident lower 4 digits, the clocking of the specified time of the receiving report by the timer 173 in the CPU 17 is started (step S110). The receiving of a message is reported by driving at least one of the speaker 22, LED 23, and vibrator 24 which is set in advance by the alarm driver 20, and at the same time, only the received message data is displayed in the display 19 by the display driver 18 (step S111).

After the display, by repeatedly determining whether or not a touching operation to instruct the reset of the key input 21 has been performed (step S112), or whether or not the timer 173 in the CPU 17 has ended the clocking of the specified time to perform the receiving report (step S114), the resetting operation and the time up of the timer 173 are waited for.

Then, if it is determined at step S112 that a reset is detected, it means that a key operation has been performed within the specified time to perform the receiving report, and therefore, after resetting the clocking operation by the timer 173, the report made by driving at least one of the speaker 22, LED 23, and vibrator 24 with the alarm driver 20, is stopped, and the display is shifted to a display only of the received message data (step S113). The state returns to a waiting state from step S101, again.

Furthermore, in the case where it is determined at step S114 that the timer 173 in the CPU 17 has ended the clocking of the specified time to perform the receiving report, it means that the specified time to perform the receiving report has elapsed without performing any key operation of the key input 21. Therefore, the report made by driving at least one of the speaker 22, LED 23, and vibrator 24 with the alarm driver 20 is stopped, and at the same time, "1" is set only to the unconfirmation flag F31 corresponding to the received message data stored in the received message area RM. In the meantime, the received message data which has been displayed in the display 19 up to that time is stopped, and instead of that, an icon (not shown) showing the presence of an unconfirmed message is displayed in the display 19 (step S115). The state returns to a waiting state from step S101, again.

Furthermore, in the case where at step S109, there are coincident lower 4 digits of the telephone number in the telephone number directory area TL, the corresponding name is read out of the telephone number directory area TL as a key word of conformity (or partial conformity) (step S116). The retrieving is performed in each of the areas RM, TL, SC, and MM of the RAM 15 by the key word (step S117). At this moment, the flags F30, F4, F5, and F6 of each area are also simultaneously referred to.

This step S117 is also immediately performed, in the case where it is determined at step S107 that such retrieved contents that "1" is set to the flag F1 at the area DMA in the data management area DM, is the key word including the telephone number. As a result of the retrieving, it is determined whether or not the corresponding data is present (step S118). If not, step moves to the processing of the receiving report and the display using only the received message data from step S110.

Furthermore, in the case where it is determined at step S118 that the corresponding data is present, the storing address of the received message data, the detection data used for retrieving, and the related key word are written and set in the area DMC of the data management area DM and the application loader 176 reads out the viewer 163 of the ROM 16 and loads it in the working memory 175 (step S119).

After that, the corresponding address LA and the associated data storing address are set and registered in the area DMD of the data management area DM and "1" is set to the flag F2 (step S120).

Next, the number of items of associated data obtained by the retrieving at step S117, is counted, and the windows corresponding to that number are developed and displayed on the label display section 191 in the display 19 in the form of adding an icon showing the label corresponding to the kind of each data (step S121).

Furthermore, the clocking of the specified time of the receiving report by the timer 173 in the CPU 17 is started, and in the meantime, the presence of receiving of a message is reported by driving at least one of the speaker 22, LED 23, and vibrator 24 which is previously set by the alarm driver 20, and at the same time, a display where the received message data is made to be the head end window, is performed by the display driver 18 in the display 19 (step S122).

After this display, by repeatedly determining whether or not a touching operation to instruct the reset of the key input 21 has been performed (step S123), or whether or not the timer 173 in the CPU 17 has finished the clocking of the specified time to perform the receiving report (step S133), the operation of reset and the time up of the timer 173 are waited for.

Then, in the case where it is determined at step S133 that the timer 173 in the CPU 17 has finished the clocking of the specified time to perform the receiving report, it means that the specified time to perform the receiving report has elapsed without performing any key operation of the key input 21. Therefore, the report made by driving at least one of the speaker 22, LED 23, and vibrator 24 with the alarm driver 20 is stopped, and at the same time, "1" is set to both the flag F30 corresponding to the received message data stored in the received message area RM and the unconfirmation flag F31 (step S134). The contents which has been displayed in the display 19 up to that time is stopped (step S135). The state returns to the waiting state from step S101, again.

If it is determined at step S123 that a reset has been detected, it means that a key operation has been performed within the specified time to perform the receiving report. Therefore, after resetting the clocking operation by the timer 173, the report made by driving at least one of the speaker 22, LED 23, and vibrator 24 with the alarm driver 20 is stopped, and "0" is set to the unconfirmation flag F31 at the corresponding data part of the received message area RM to release the unconfirmed state, and in the mean time, a plurality of windows including the received message data are developed and displayed, again (step S124).

At this moment, the part corresponding to the key word is discriminated by using, for example, reversing, under line, or the like to be displayed.

Figure 28:
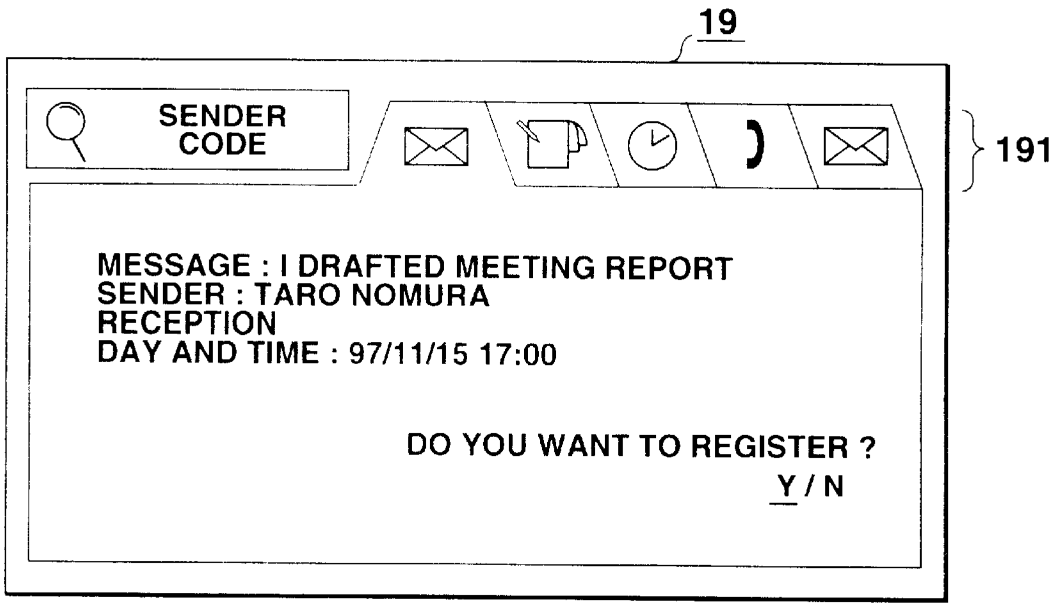
FIG. 28 shows the display screen by the operation according to the second embodiment.

FIG. 28 shows the display screen of the display 19 at this moment, and an image is displayed in the window, where the message (contents) "I drafted meeting report," the sender "Taro NOMURA," and the reception day and time "97.11.15 17:00" are printed as the received message data on the card as window to which the label of "envelope" positioned at the head end is added, among 5 cards to which each of the icons of "envelope" showing the received message data, "memo pad" showing the memo data, "clock" showing the schedule data, and "(telephone) receiver" showing the telephone number directory data, is added as a label on the label display section 191.

In this case, to the part "NOMURA" in the sender "Taro NOMURA," the underline display is applied, and on the other hand, the guide message "registration will be performed ? Y/N" is displayed, which urges the instruction of whether the received message data should be displayed in the window after this as the associated data or not.

If the user operates "Y" to instruct registration, or "N" to instruct no registration according to the guide message, the contents are determined next to that by determining whether the instruction of the registration has been detected or not. (step S125).

If it is determined that the "Y" is operated, it means that the registration of the window display of the received message data has been instructed, and therefore, "1" is set to the corresponding flag F30 of the message data stored in the received message area RM (step S126).

If it is determined at step S125 that not "Y" but "N" has been operated, it means that such an instruction that the window display of the received message data from now should not be registered, has been issued, and therefore, "0" is set to the corresponding flag F30 of the message data stored in the received message area RM (step S126).

After that, by repeatedly determining whether there is an input to indicate the label parts of a plurality of windows displayed in the label display section 191, by a touching operation at the key input 21 or not (step S128), or whether the timer 173 in the CPU 17 has ended the clocking of the specified time or not (step S132), which is similar to the above description, the indication of the label parts and the time up of the timer 173 are waited for.

In the case where it is determined at step S132 that the timer 173 in the CPU 17 has ended the clocking of the specified time, it means that the specified time has elapsed without performing any indicating operation at the label part of each window, and therefore, the contents which have been displayed in the display 19 up to that time, are stopped (step S135), and the state returns to a waiting state from step S101, again.

Furthermore, in the case where it is determined at step S128 that one of the respective label parts of a plurality of windows has been indicated by a touching operation, the area DMD of the data management area DM is referred to by the viewer, and the corresponding data is read out of the telephone number directory area TL, the schedule data area SC, or the memo data area MM of the RAM 15 by using the associated data storing address of the corresponding data, and the display is performed so that the data may be the window at the head end (step S129).

Figure 29:
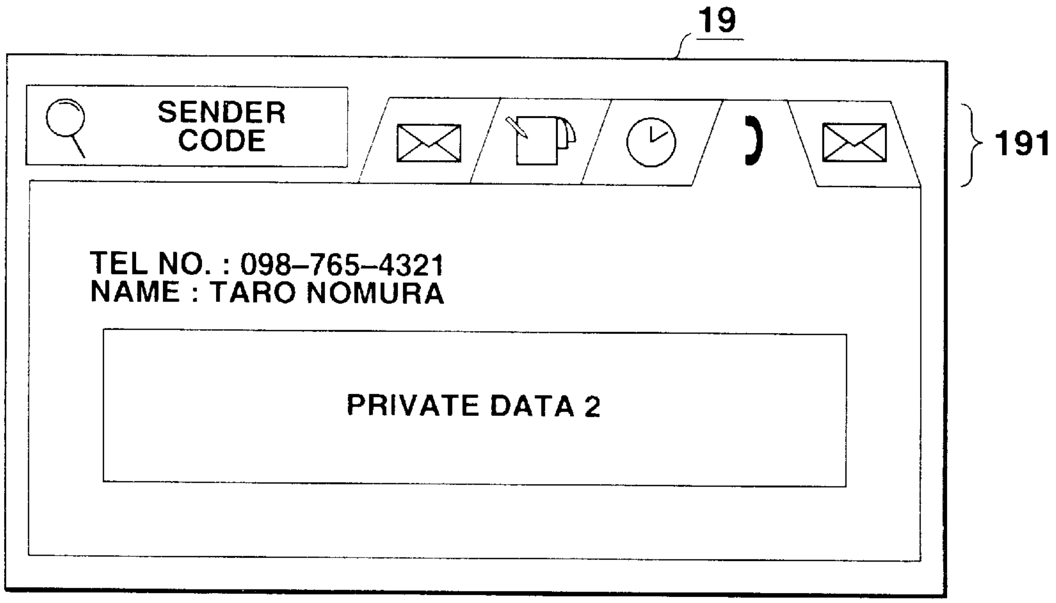
FIG. 29 shows the display screen by the operation according to the second embodiment.

FIG. 29 shows the data displayed in the case where the label part of "(telephone) receiver" showing the telephone number directory data is operated from the state shown in FIG. 28, and here, the associated data storing address "4900" is read out of the area DMD of the data management area DM, and by using the address, "private data 2" of the telephone number, the name, the address, and the like which are the telephone number directory data of Mr. "Taro NOMURA" are read out of the address "4900" and so on of the telephone number directory area TL, and are displayed in the display 19 as the head end window.

Under the display state like this, furthermore, the detection of an instruction by a touching operation of the label part of the window displayed at the head end (on the label display section 191), is waited for (step S130), and when it is determined that detection has been performed, the mode shifts from the read out mode of the received message data to a mode associated with the instructed label part, and the contents stored in the register 174 are transmitted to the areas DMC, DMD of the data management area DM, and the application loader 176 reads out the application program corresponding to the mode associated with the instructed label part, in addition to the viewer, from the application program memory 162 of the ROM 16, and loads them in the working memory 175.

That is, the step moves to the operation in this associated mode while keeping the window display (step S131).

If it is determined at step S101 that a selective operation of a mode directly performed by the key input 21 has been detected from the state of waiting for the receiving, whether the selected mode is the read out mode of the received message data or other modes, is determined, next to that (step S140).

If it is determined that the mode selected here is the read out mode of the received message data, the message data in which "1" is set to the unconfirmation flag F31, is retrieved in the received message area RM of the RAM 15 (step S141), and after that, whether there is a message data in which "1" is set to the flag F31 or not is determined (step S142), and in the case where it is determined that there is one, the message data in which "1" is set to the flag F31, is preferentially read out (step S143).

Furthermore, in the case where it is determined that there is no message data in which "1" is set to the flag F31, the newest one is read out according to the contents of the reception day and time of each message data (step S144).

Then, regardless of the presence or absence of the message data in which "1" is set to the flag F31, the read out message data is analyzed (step S145), and whether "1" is set to the corresponding flag F30 or not is determined (step S146).

If it is determined that "1" is set to the flag F30 of the corresponding message data, the received message storing address registered in the area DMC of the data management area DM is referred to, and the contents of the corresponding address LA are read out (step S147).

Then, by using the read out corresponding address LA, all associated data storing addresses in which "1" is set to the flag F2 in the area DMD of the data management area DM, are read out (step S148), and by using the read out addresses, the corresponding data is read out of the received message area RM, the telephone number directory area TL, the schedule data area SC, and the memo data area MM, so that a plurality of windows corresponding to the number of items of associated data may be developed and displayed in the display 19 (step 149).

Then, after starting the widow display corresponding to the associated data, whether the instruction for releasing the registration of the window display has been detected or not is determined (step 150), and only in the case of determining that the instruction has been detected, "0" is set to the flag F30 of the corresponding received message data of the received message area RM (step S151), and after that, the step moves to the processing of waiting for the instruction of the label part of each window and the time up of the timer 173, from step 128.

Furthermore, in the case where it is determined at step S146, as the result of the analyzing of the read out message data that not "1" but "0" is set to the flag F30, a plurality of window displays by the associated data are not performed, and while displaying only the read out received message data in the display 19 (step S152), the read out mode of the received message data is stopped, and the performance of the selective operation for shifting to the original receiving waiting state, is waited for (step 153).

Then, when it is determined that the selective operation has been performed, the read out mode is stopped, and the state moves to the waiting state from step S101, again according to the operation.

Furthermore, in the case where it is determined at step S140 that the mode directly selectively operated by the key input 21 from the state of waiting for the receiving is a mode other than the read out mode of the received message data, whether the mode is the setting mode of a key word, or one of the telephone number directory mode, the schedule mode, and the memo mode, is determined, next to that (step S161).

If it is determined that the mode is one of the telephone number directory mode, the schedule mode, and the memo mode, the application loader 176 reads out the corresponding application program from the application program memory 162 of the ROM 16, and loads that in the working memory 175, and in the state where the initial screen display of each mode is displayed in the display 19 (step S162), whether the selective operation for newly performing the registration of the data has been performed by the key input 21 or mot is detected (step S163).

If it is determined that the operation has been performed, continuously, in the sate where the screen for inputting the data is displayed in the display 19 instead of the initial screen (step S164), while performing the display processing associated with the data of each item which is input in turn (step S165), the input of the data is finished, and by repeatedly performing the processing of determining whether an instruction of registration has been detected or not (step S166), the detection of an instruction of registration of the data is waited for.

Then, when it is determined that an instruction of registration has been detected, a guide message to prompt the selection of whether the associating with the message data should be performed or not, is displayed, next to that (step S167), and then, whether the instruction to perform the associating has been issued according to that display or not, is determined (step S168).

When it is determined that the instruction to perform the associating has been issued, "1" is set to the flag F4 of the corresponding data of the telephone number directory area TL, if the selected mode is the telephone number directory mode and the input data is the telephone number directory data, or "1" is set to the flag F5 of the corresponding data of the schedule data area SC, if the selected mode is the schedule mode and the input data is the schedule data, or "1" is set to the flag F6 of the corresponding data of the memo data area MM, if the selected mode is the memo mode and the input data is the memo data (step S169), and then, the step returns to the processing from step S162, again for preparing for the next data input.

Furthermore, when it is determined at step S168 that an instruction so as not to perform the associating of the received message data corresponding to the input data, has been issued, "0" is set to the flag F4 of the corresponding data of the telephone number directory area TL, if the selected mode is the telephone number directory mode and the input data is the telephone number directory data, or "0" is set to the flag F5 of the corresponding data of the schedule data area SC, if the selected mode is the schedule mode and the input data is the schedule data, or "0" is set to the flag F6 of the corresponding data of the memo data area MM, if the selected mode is the memo mode and the input data is the memo data, contrary to step S169 (step S170), and then, the step returns to the processing from step S162, again for preparing for the next data input.

Furthermore, when it is determined at step 163 that the selective operation for newly performing the registration of the data is not performed, the editing or deletion of the previously registered data should be performed next to that, and whether the instruction thereof has been detected or not is determined (step S171), and if it is not detected, the step returns to the processing from step S162, again.

Then, if it is determined at step S171 that the instruction of editing or deletion of the data has been detected, the corresponding data is read out of the telephone number directory area TL, the schedule data area SC, or the memo data area MM according to the continuous input operation, and in the state of displaying the data in the display 19 (step S172), while performing the display processing associated with the data of each item which is input and edited, or stopped in turn (step S173), by repeatedly performing the processing of determining whether the determining instruction of the contents of the data has been detected or not (step S174), the detection of the determining instruction of the data is waited for.

Then, at the time of determining that the determining instruction has been detected, it is determined whether "1" is set to the flag F4 of the corresponding data of the telephone number directory area TL, or to the flag F5 of the corresponding data of the schedule data area SC, or to the flag F6 of the corresponding data of the memo data area MM, depending on the mode (step S175).

If it is determined that "1" is set to the flag, the guide message to prompt the selection of whether or not the associating with the message data should be performed, is displayed (step S176), and then, it is determined whether or not the instruction to perform the associating has been issued according to that display (step S177).

If it is determined that the instruction to perform the associating has been issued, the step returns to the processing from step S162, again for preparing for the next data input.

If it is determined at step S177 that the instruction so as not to perform the associating of the received message data corresponding to the input data, has been issued, "0" is set to the flag F4 of the corresponding data of the telephone number directory area TL, if the selected mode is the telephone number directory mode and the input data is the telephone number directory data, or "0" is set to the flag F5 of the corresponding data of the schedule data area SC, if the selected mode is the schedule mode and the input data is the schedule data, or "0" is set to the flag F6 of the corresponding data of the memo data area MM, if the selected mode is the memo mode and the input data is the memo data (step S178).

After that, "0" is set to the flag F2 of the associated data in the area DMD of the data management area DM (step S179). After resetting the number of items of associated data in the area DMD (step S180), the step returns to the processing from step S162, again for preparing for the next data input.

Furthermore, in the case where it is determined at step S175 that "1" is not set to the flag F4 of the corresponding data of the telephone number directory area TL, or to the flag F5 of the corresponding data of the schedule data area SC, or to the flag F6 of the corresponding data of the memo data area MM, depending on the mode, the guide message to prompt the selection of whether or not the associating with that message data should be performed, is displayed (step S181). Then, it is determined whether or not the instruction to perform the associating has been issued according to that display (step S182).

When it is determined that the instruction to perform the associating has been issued, "1" is set to the flag F4 of the corresponding data of the telephone number directory area TL, if the selected mode is the telephone number directory mode and the input data is the telephone number directory data, or "1" is set to the flag F5 of the corresponding data of the schedule data area SC, if the selected mode is the schedule mode and the input data is the schedule data, or "1" is set to the flag F6 of the corresponding data of the memo data area MM, if the selected mode is the memo mode and the input data is the memo data (step S183). The step returns to the processing from step S162, again for preparing for the next data input.

Furthermore, when it is determined at step S182 that the instruction so as not to perform the associating of the received message data corresponding to the input data, has been issued, the step returns to the processing from step S162, again for preparing for the next data input.

FIG. 27 shows the stored contents of the data management area DM in the case where the processing is performed while shifting to each mode after the receiving of the message data, which is also shown in FIG. 26. During the processing of the receiving, the received message data is written in the register 174, and it is understood that at the storing address "4200"of the received message area RM in the area DMC, the received message data in which the detecting object data is "4321" and the related key word is "NOMURA" is stored, and that there are "4" other data associated with that, in the received message area RM, the telephone number directory area TL, the schedule data area SC, and the memo data area MM.

Furthermore, in the case where it is determined at step S161 that the selected mode is the keyword setting mode, the absence of the detection of the operation for escaping from the key word setting mode is confirmed (step S192), in the state of displaying the initial screen display of the corresponding mode in the display 19 according to that operation (step S191). By repeatedly determining whether or not the selective operation for newly performing the registration of a key word has been performed (step S193), or whether or not the selective operation for performing editing/deletion of the previously registered key word has been performed (step S199), either of them is waited for.

Then, if it is determined at step S193 that the operation for newly performing the registration of a key word has been performed, the screen for inputting a key word is displayed in the display 19 instead of the initial screen (step S194). The display processing associated with the data of the key word which is input is performed (step S195). By repeatedly performing the processing of determining whether or not the instruction of the registration has been detected (step S196), the detection of the instruction of the registration of the data composing the key word is waited for.

Then, when it is determined that the instruction of the registration has been detected, the data of the input key word is written and set in the area DMB of the data management area DM as the retrieving object data (step S197). "1" is set to the corresponding flag F1 of the area DMB (step S198). The step returns to the processing from step S193, again for receiving the input of the next key word.

If it is determined at step S199 that the selective operation for performing editing or deletion of the previously registered key word has been performed, the key word to be the object of editing or deletion according to the input operation is read out among from the retrieving object data of the area DMB of the data management area DM (step S200).

Then, while performing the display processing associated with the contents which are subjected to input and editing in turn for the data of the read out key word (step S201), the detection of the instruction of determining by editing/deletion of the key word is waited for, by repeatedly performing the processing of determining whether the instruction to determine the contents has been detected or not (step S202).

Then, when it is determined that the determining instruction has been detected, it is determined whether or not "1" is set to the flag F1 for the corresponding retrieving object data of the area DMB of the data management area DM (step S203).

If it is determined here that "1" is set to the flag F1, the data of the key word whose contents are edited as the retrieving object data is again written and set in the area DMB of the data management area DM, and a guide message for prompting the selection of whether or not the retrieving by the key word should be performed when the message is received, is displayed (step S204). In the case where such an instruction that the data of the key word should not be edited but be stopped, has been issued, the corresponding retrieving object data is stopped from the area DMB instead of the writing-in setting.

Then, it is determined whether or not the instruction to perform the retrieving has been detected according to that display (step S205). If it is determined that the instruction to perform the retrieving has been detected, the step returns to the processing from step S193 again for receiving the next key word input.

If the instruction to perform the retrieving by the key word when the message is received, is not detected at step S205, "1" which has been set to the flag F1 of the corresponding data of the area DMB of the data management area DM, is reset to "0" (step S204). After that, the stored contents respectively including the corresponding addresses LA of the areas DMC and DMD of the data management area DM, are stopped (step S207). Then, the step returns to the processing from step S193 again for receiving the next key word input.

If it is determined at step S203 that "1" is not set to the flag F1 for the corresponding retrieving object data of the area DMB of the data management area DM, the data of the key word whose contents are edited, is again written and set into the area DMB of the data management area DM, as the retrieving object data, and the guide message to prompt the selection of whether or not the retrieving by the key word should be performed when the message is received, is displayed (step S208). If such an instruction that the data of the key word should not be edited but be stopped, has been issued, the corresponding retrieving object data is stopped from the area DMB instead of the writing-in setting.

Then, it is determined whether or not the instruction to perform the retrieving according to that display has been detected (step S209). If it is determined that the instruction to perform the retrieving has been detected, "1" is set to the flag F1 of the corresponding data of the area DMB (step S210). Then, the step returns to the processing from step S193 again for receiving the next key word input.

If the instruction to perform the retrieving by the key word when the message is received, has not been detected at step S209, the step returns to the processing from step S193 again for receiving the next key word input.

Furthermore, at step S131 and afterward, in each mode, the newly input and created data can be registered as the transmission data.

Figure 30:
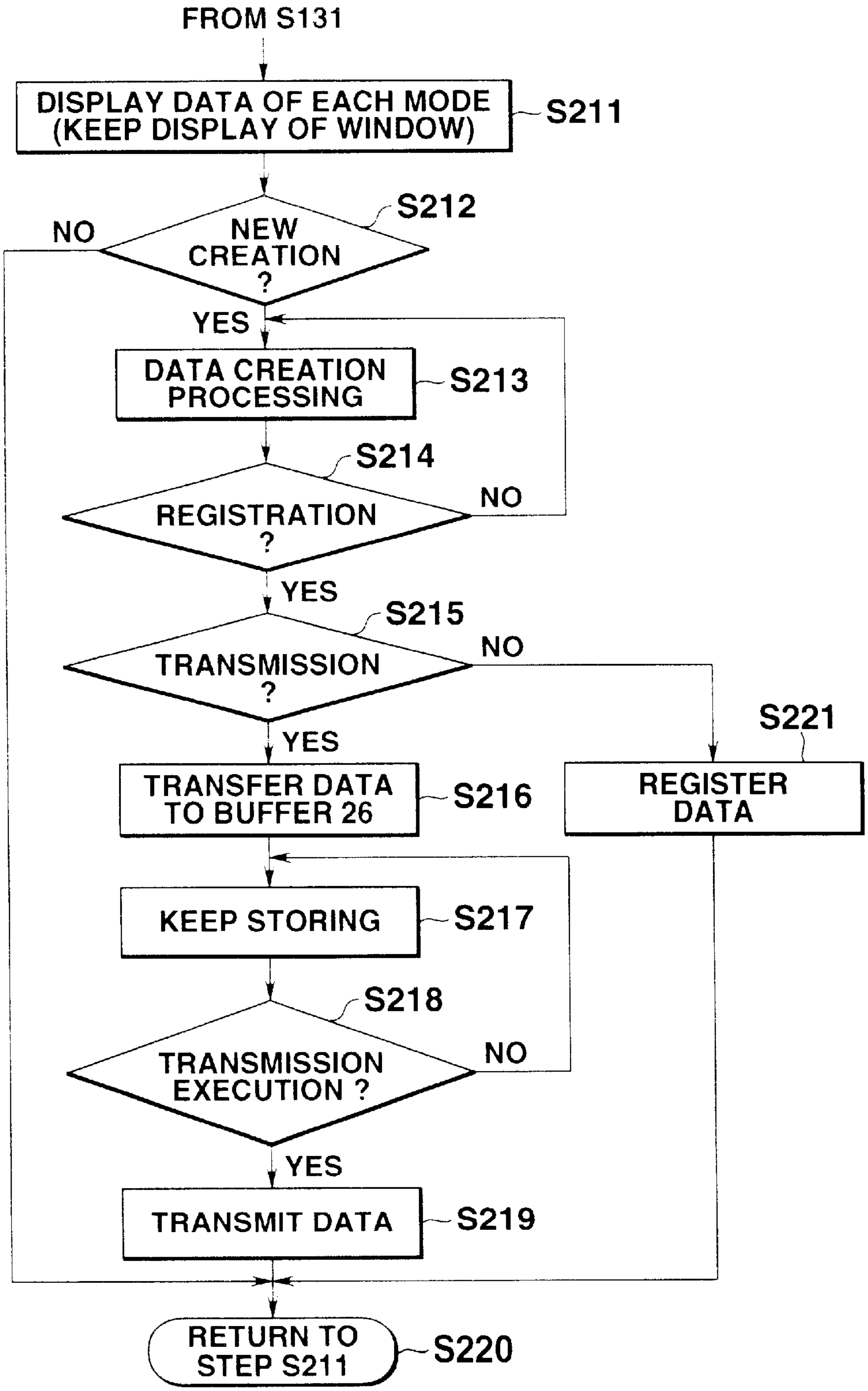
FIG. 30 is a flow chart explaining the operation according to the second embodiment.

FIG. 30 is a flow chart showing a series of flow up to new input/registration/transmission processing of the data after shifting to each mode.

In this flow chart, when shifting to the operation in the associated mode from step S131, the application program corresponding to that mode is loaded in the working memory 175 while keeping the window display (step S211).

In this state, it is determined whether or not the selective operation to newly perform the registration of the data has been performed by the key input 21 (step S212).

If it is determined that the operation has been performed, the screen for inputting the data is displayed in the display 19 instead of the initial screen, while performing the data creation processing and display processing by the continuous inputting (step S213) and the data creation processing is finished. By repeatedly performing the processing of determining whether or not the registration instruction has been detected (step S214), the detection of the registration instruction of the data is waited for.

Then, when it is determined that the registration instruction has been detected, the guide message to prompt the selection of whether or not the data should be sent through the communication network is displayed (not shown), and after that, it is determined whether or not the transmission request has been performed (step S215).

If it is determined that the transmission request has been performed, the conversion program stored in the ROM 16 is further loaded in the working memory 175, and the created data is converted into the data corresponding to the transmission network for sending and is transmitted to the transmission buffer 26. Furthermore, at this moment, the data associated with the other end to which the data is sent, is read out of, for example, the telephone number directory area TL, and is set in the transmission buffer 26 (step S216), and is made to be in the storage keeping state (step S217).

After that, by determining whether or not the specified key operation of the key input 21 has been detected, the execution of transmission is determined, and if the transmission execution request is detected, the data is transmitted from the transmitter 27 (step S219), and the step returns to step S211.

If the transmission execution request is not detected, the flow returns to the storage keeping state (step S217).

Furthermore, even if the transmission execution request of the created data is not detected at step S215, the registration processing of the data is performed (step S221).

Accordingly, by making it possible to perform such a transmission processing, a desired data can be created and edited in the corresponding mode while referring to the associated data of other modes by the viewer, and the transmission of that data can be transmitted.

Figure 24:
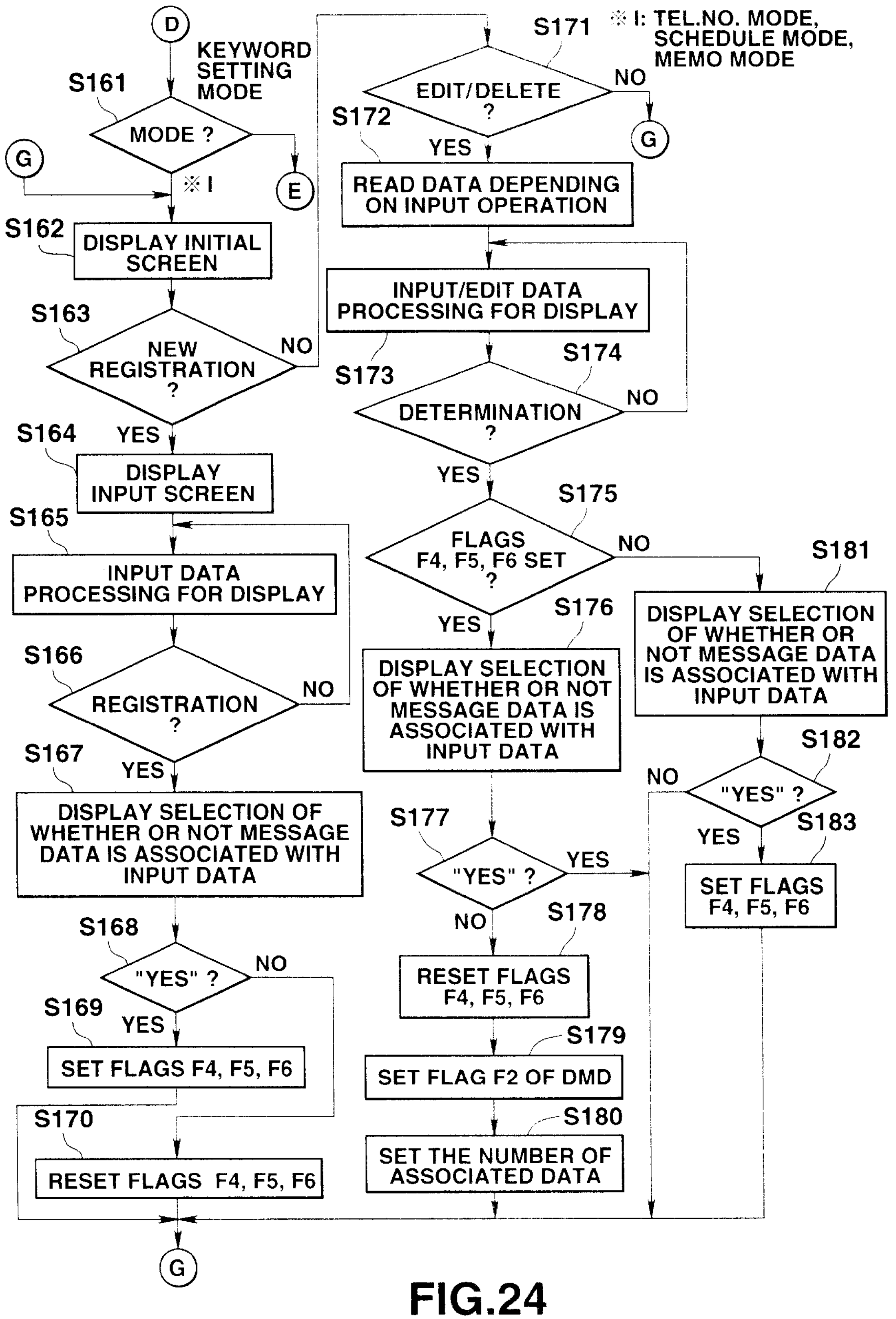
FIG. 24 is a flow chart explaining the operation according to the second embodiment.
Figure 25:
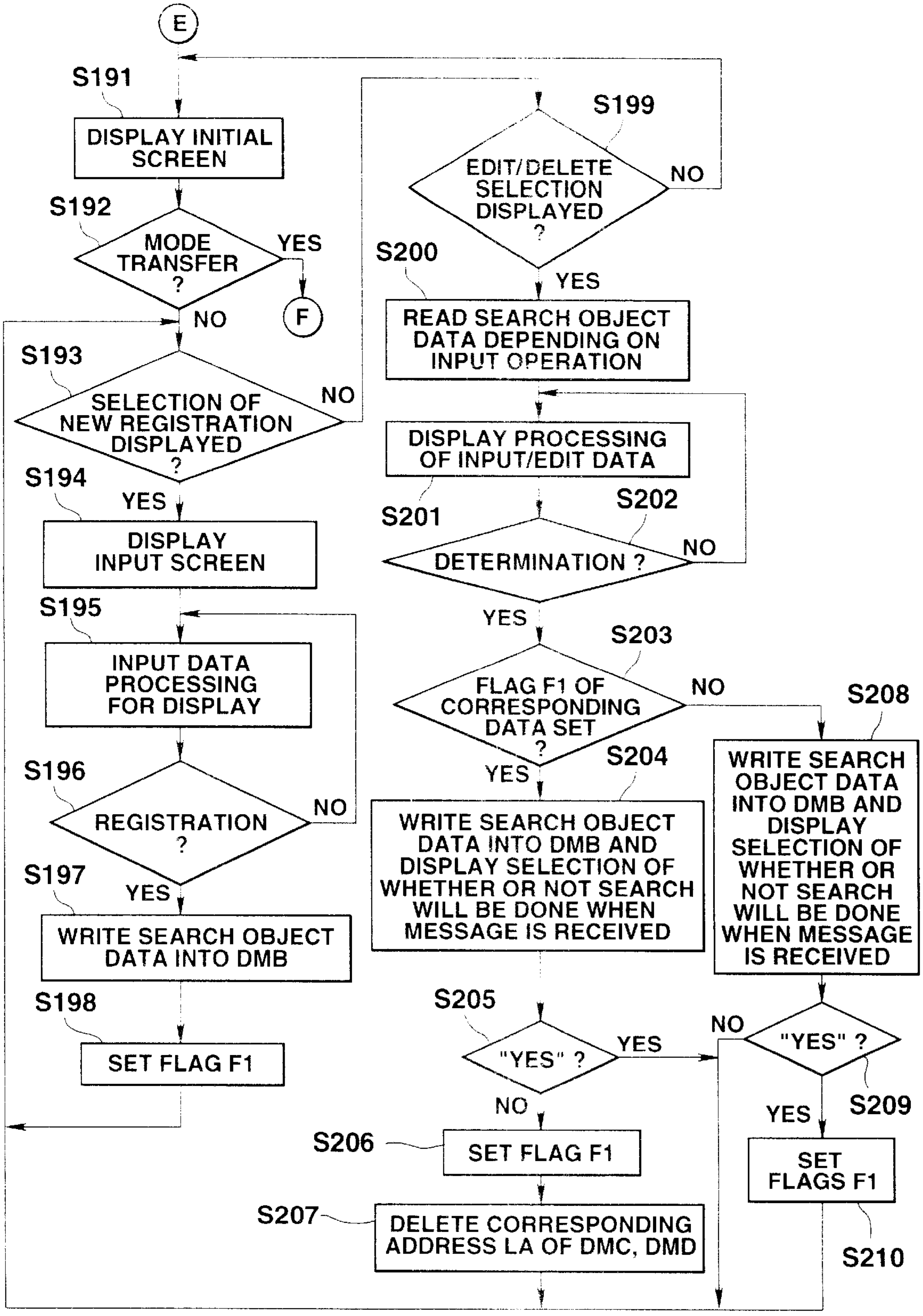
FIG. 25 is a flow chart explaining the operation according to the second embodiment.

Furthermore, the transmission processing can be executed between step S165 and step S166, or step S174 and step S175 in FIG. 24.

Furthermore, in the data management area DM, a new area DME may be provided as shown in FIG. 31, instead of the area arrangement shown in FIG. 16 and FIG. 27. In this case, it is arranged that in the area DME, an icon of the label can be set, corresponding to the storing address of the associated data, and therefore, it is arranged that in the display at the time of receiving of the message data, an icon of the label of one's own making can also be displayed, other than the label previously set in each mode.

Thus, in the state where the data associated with the receiving message data is displayed in the window, not only it can be displayed in the state where to which mode each data belongs, is visually understandable, but also it is possible to immediately shift from the state of being displayed in the window to the corresponding mode, so that a more practical operational environment can be achieved.

Third Embodiment

In the second embodiment, it is arranged that in addition to the first embodiment, an icon is displayed as the label of each window at the time of window display, so that the shift to the operation of each mode may be performed while keeping the window display, but furthermore, in the third embodiment, the case where the display priority can be set as for the window display, will be described in detail.

The third embodiment in the case where the present invention is applied to a paging receiver which has the function of an electronic notebook and conforms to the standard RCRSTD-43, will be described below by referring to drawings.

By the way, the present embodiment is basically similar to that shown in FIG. 14, and therefore, the same numeral is applied to the same part, and the description thereof will be omitted.

FIG. 32 shows the stored state of each application program which is stored in the application program memory 162 like a table.

In this figure, in each application program, the minimum number of bytes required for the working memory during the loading of the program is stored in the correlated state.

That is, the load of the CPU 17 required for loading the program is smaller and the mode shift is faster as this number of bytes is smaller. It is expressed that on the contrary, the load of the CPU 17 required for loading the program is larger and the mode shift is slower as the number of bytes is larger.

Furthermore, in the case of the viewer, which is not shown in the figure, only the data display is performed, and therefore, the minimum number of executive bytes thereof is substantially smaller than that of these application programs.

FIG. 33 to FIG. 36 respectively show the stored contents of the received message area RM', telephone number directory area TL', schedule data area SC', and the memo data area MM' which are similar to those in the second embodiment.

In FIG. 33 to FIG. 36, the third embodiment is different from the second embodiment, in that the data volume (bytes) is stored and managed corresponding to each data in the received message area RM' and schedule data area SC', and that the data volume and the day and time of registration of the data are stored and managed corresponding to each data in the telephone number directory area TL'and memo data area MM'.

FIG. 37 shows the arrangement and the stored contents of the data management area DM' in the third embodiment.

Similarly to the second embodiment, it comprises 4 areas DMA to DMD, but in addition to them, it further comprises an area DMF.

In the area DMF, an item which defines the display priority of the window display (overlap display) of the associated data if a plurality of associated data of the message data are detected when a message is received, and a flag W are stored in the correlated state.

That is, during the window display of a plurality of associated data, if "1" is set to the flag W corresponding to "the number of bytes for executing application," the overlap display of the window is performed in such a way that one in which the load of the CPU 17 for loading is lighter, in the application programs corresponding to a plurality of associated data to be displayed, is preferentially displayed.

If "1" is set to the flag W corresponding to "data volume," the priority of the overlap display of the window is determined according to the volume of a plurality of associated data to be displayed.

If "1" is set to the flag W corresponding to "schedule start day and time/registration day and time/reception day and time," by referring to the day and time information (start day and time if it is the schedule data, registration day and time if it is the memo data or the telephone number directory data, and reception day and time if it is the received message data) of the plurality of associated data to be displayed, the overlap display of the window is performed in such a way that one having the latest day and time is preferentially displayed.

By the way, in the flag W, the setting can properly be changed by detecting the operation from the key input 21, which is not described in detail.

Figure 22:
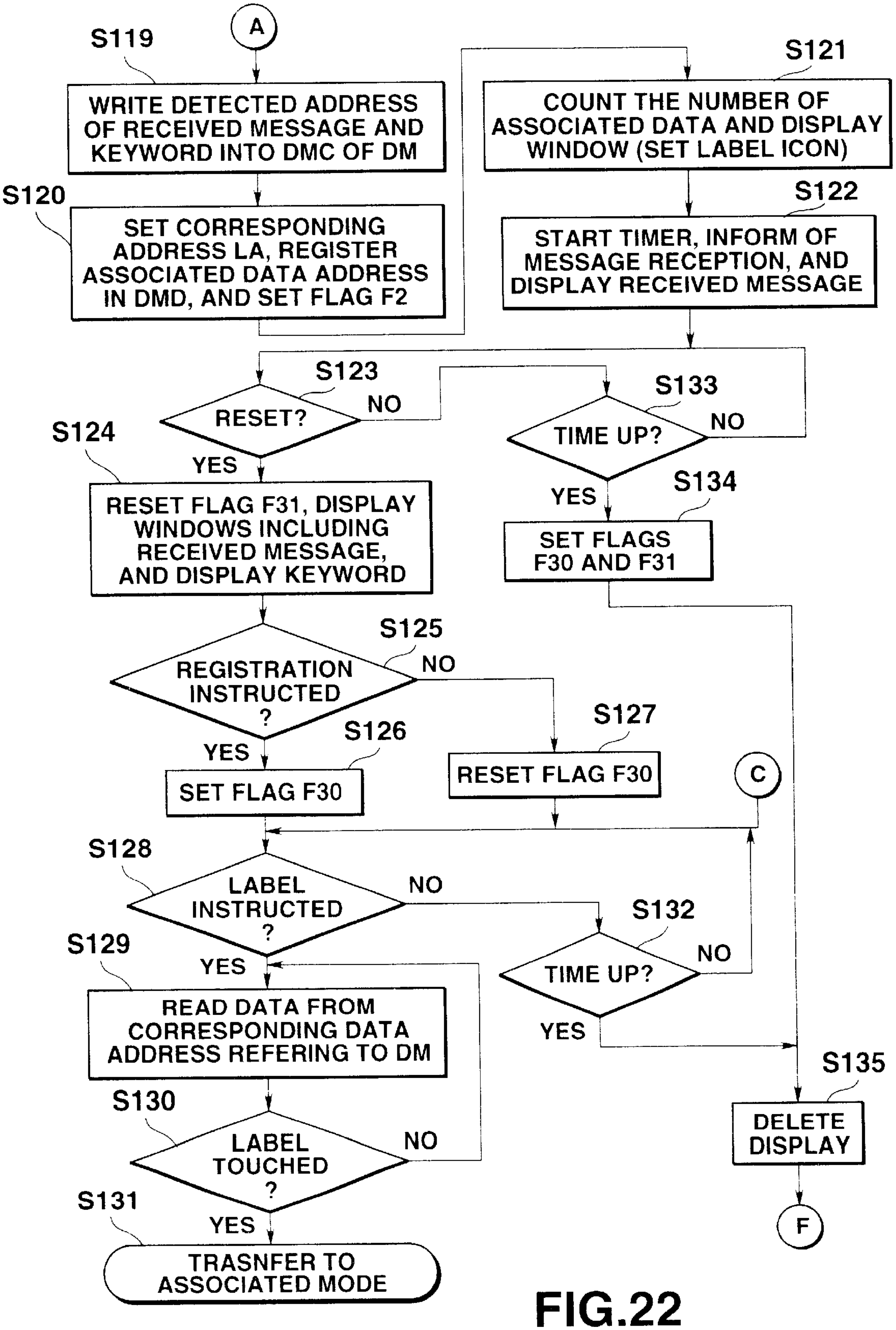
FIG. 22 is a flow chart explaining the operation according to the second embodiment.
Figure 23:
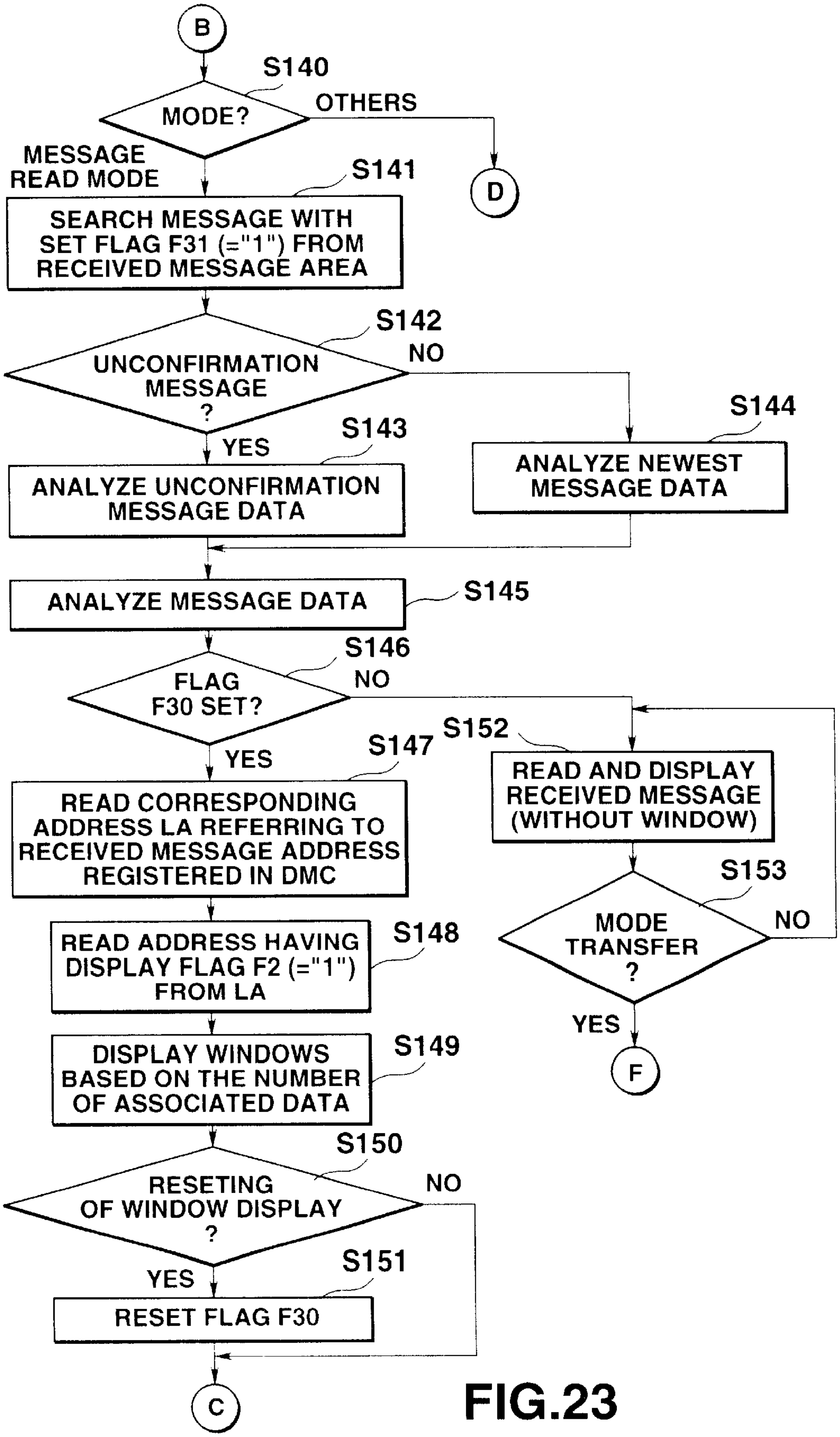
FIG. 23 is a flow chart explaining the operation according to the second embodiment.
Figure 38:
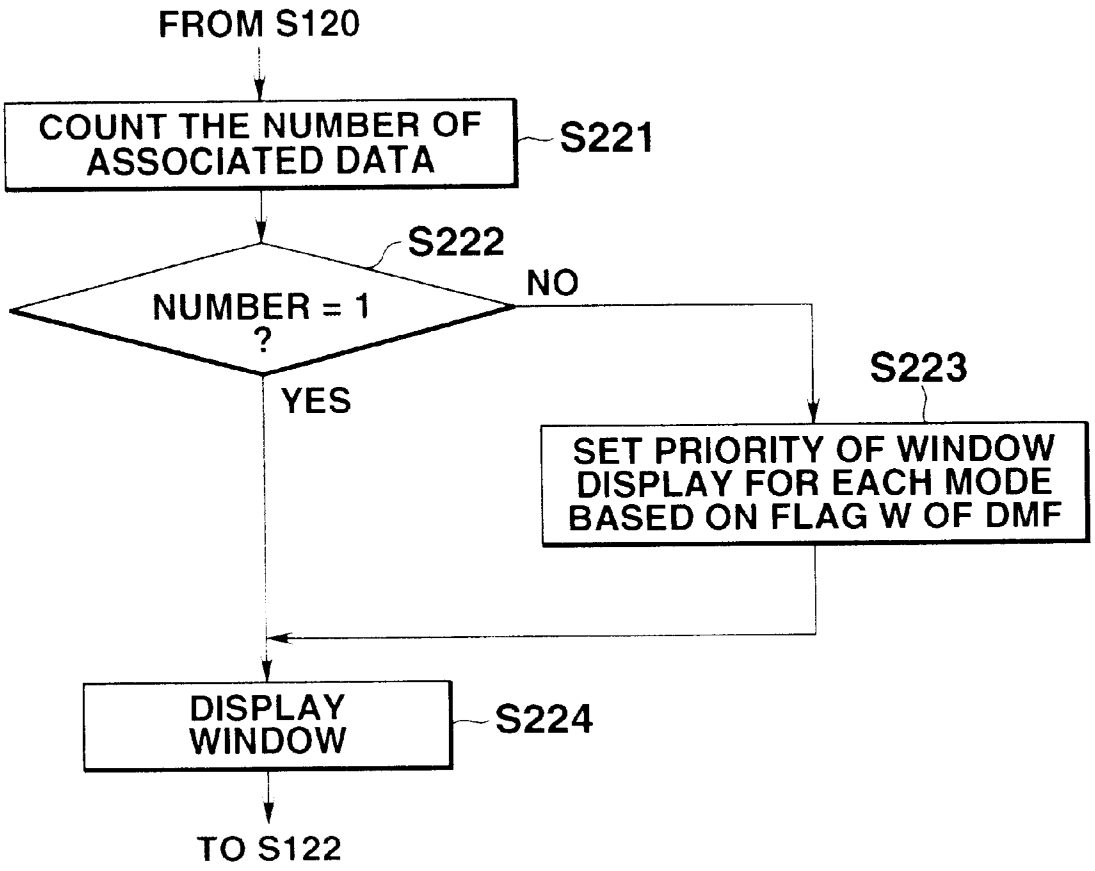
FIG. 38 is a flow chart explaining the operation according to the third embodiment.

FIG. 38 shows the contents of the processing from the message receiving state in the third embodiment, which is a flow chart of the processing performed between step S120 and step S122 of FIG. 22 in the second embodiment.

In FIG. 38, if "1" is set to the flag F2 (step S120) after setting and registering the corresponding address LA and the associated data storing address in the area DMD of the data management area DM, the number of items of associated data obtained by the retrieving at step S117 is counted (step S221).

Then, it is determined whether or not the number of items of associated data is 1 or more (step S222). If it is "1", the window corresponding to the associated data is developed and displayed in the display 19 in the form where an icon showing the label corresponding to the kind of each data is also added (step S224).

If the number of items of associated data is more than "1", the priority of the window display is determined according to the priority by which "1" is set to the flag W in the area DMF (step 223). After that, the windows corresponding to these associated data are developed and displayed in the display 19 in the form where an icon showing the label corresponding to the kind of each data is also added (step S224).

Figure 39:
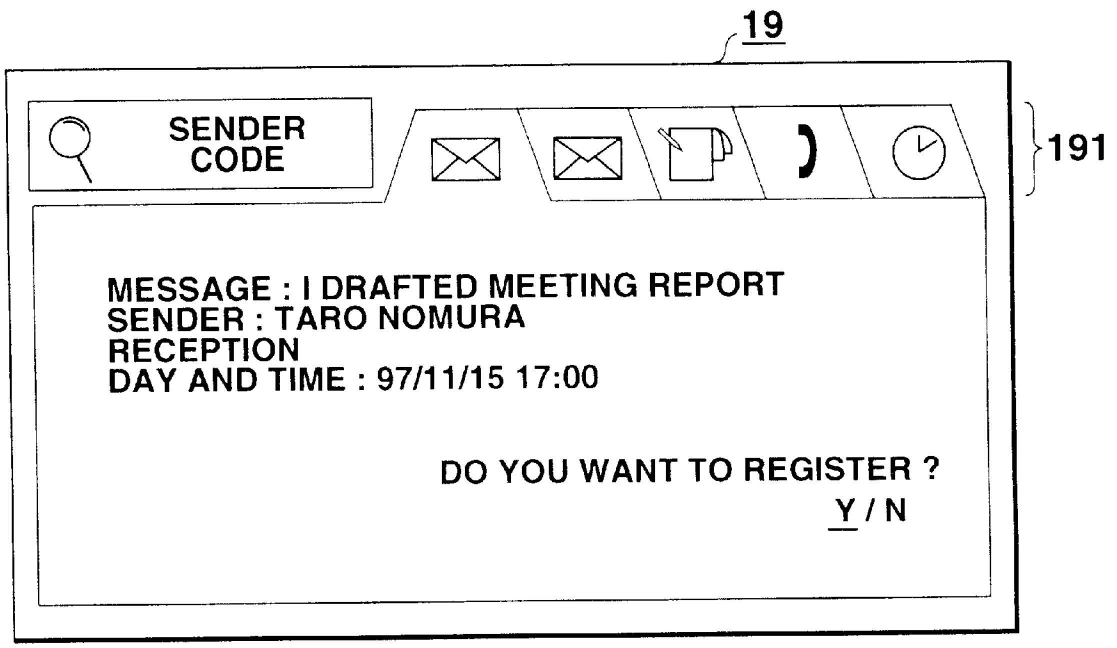
FIG. 39 shows the display screen by the operation according to the third embodiment.

FIG. 39 shows the display screen of the display 19 at this moment, and 5 cards (windows) to which the respective icons of "envelope" showing the received message data, "envelope" showing the past received message data, "memo pad" showing the memo data, "telephone receiver" showing the telephone number directory data, and "clock" showing the schedule data, are added as the label, are displayed in the overlapped state, in the order in which the number of executive bytes of the application program is smaller.

According to the present invention, it is easy to confirm whether or not data associated with input data is stored in a memory (RAM 15) of the device when the data is input and to refer the associated data.

Since a label or icon indicating the type or the identification number of the associated data is displayed if a plurality of associated data are present, each of the associated data can be easily referred to even if a plurality of associated data are searched for.

Further, a label or icon indicating the type or the identification number of the associated data is displayed according to the priority of each associated data relating to the day and time when the data is stored, the size (or volume) of the data, and the load of the CPU processing the data. Therefore, it is easy to understand the status of the associated data.

Moreover, it is possible to select whether or not data stored in the memory (RAM 15) is displayed as the associated data.

Since the input data and the associated data are displayed as a window and the window display is easily switched in a simple operation. Therefore, a load for display is small so that a portable data processing device can display them without causing any trouble.

According to the present program for editing the associated data, the associated data is displayed first and then loaded. Thus, it is possible to decrease the load of the device and the system.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the second and third embodiments, it is arranged that the application loader 176 loads the viewer 163 during the window display of the associated data at the time of receiving the message data, and loads the corresponding application program when the processing has shifted to step S162 (FIG. 24).

However, in the case where the viewer 163 is not stored in the ROM 16, it is also possible that among the application programs corresponding to the associated data, a program required only for the display is loaded during the display of the associated data at the time of receiving the message data, and all these application programs are loaded when the processing has shifted to step S162 (FIG. 24).

Furthermore, in the first to third embodiments, the case where the present invention is applied to a paging receiver which has the function of an electronic notebook and conforms to the standard RCRSTD-43, is described, but the present invention is not limited to this, and it can also easily be applied to an electronic equipment storing the data which may be associated with the input message data, such as a digital portable telephone or a PHS (Personal Handyphone System: simplified cordless telephone) which can store, for example, the telephone number directory data and can perform sending and receiving of the electronic mail.

Furthermore, it is also possible that the contents of the control (window display control, shifting display control) are previously stored in the portable storage medium 29, and are read out by the storage medium driver 28 to be written in the ROM 16, if needed.

Furthermore, the present invention can be carried out in various modifications in the range in which they do not depart from the true spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A message data reception device comprising:

a receiver which receives a message data item transmitted from a sender;

a memory which stores the received message data item and other data items related to the sender;

a search unit which searches the memory to identify at least one of said other data items;

a viewer loader which loads a predetermined viewer program for viewing each of said other data items identified by the search unit into a work memory;

a display which displays in a display screen the received message data item and a heading for each of said other data items identified by the search unit; and a display controller which controls the display to display in the display screen a selected one of said other data items identified by the search unit, in place of the received message data item, along with the heading for each of said other data items identified by the search unit, when the heading for said selected other data item is selected.

2. The device according to claim 1, wherein the other data items stored in the memory include at least one of identification data, schedule data, and memorandum data of the sender.

3. The device according to claim 2, wherein the identification data comprises at least one of telephone number data, name data, and private data of the sender.

4. The device according to claim 3, wherein the private data comprises at least one of address data, birthday data, and company name data.

5. The device according to claim 2, wherein the schedule data comprises at least one of reserved day and time data and schedule contents data.

6. The device according to claim 1, wherein the display displays overlapped cards each having a data item display area and a heading display area such that all the heading display areas are simultaneously displayed without overlapping.

7. The device according to claim 1, wherein the display displays overlapped windows each having a header portion which are not overlapped, and wherein each window comprises a data item display area and the header portion comprises a heading display area.

8. The device according to claim 1, wherein the memory also stores an address of the received message data item.

9. A message data reception method comprising:

receiving a message data item transmitted from a sender;

storing in a memory the received message data item and other data items related to the sender;

searching the memory to identify at least one of said other data items;

loading a predetermined viewer program for viewing each of said other data items identified by the search unit into a work memory;

displaying in a display screen on a display the received message data item and a heading for each of said other data items identified by the search unit; and controlling the display to display in the display screen a selected one of said other data items identified by the search unit, in place of the received message data item, along with the heading for each of said other data items identified by the search unit, when the heading for said selected other data item is selected.

10. The method according to claim 9, wherein the other data items stored in the memory include at least one of identification data, schedule data, and memorandum data of the sender.

11. The method according to claim 10, wherein the identification data comprises at least one of telephone number data, name data, and private data of the sender.

12. The method according to claim 11, wherein the private data comprises at least one of address data, birthday data, and company name data.

13. The method according to claim 10, wherein the schedule data comprises at least one of reserved day and time data and schedule contents data.

14. The method according to claim 9, wherein the display is controlled to display overlapped cards each having a data item display area and a heading display area such that all the heading display areas are simultaneously displayed without overlapping.

15. The method according to claim 9, wherein the display is controlled to display overlapped windows each having a header portion which are not overlapped, and wherein each window comprises a data item display area and the header portion comprises a heading display area.

16. The method according to claim 9, wherein the an address of the received message data item is also stored in the memory.

* * * * *